United States Patent [19]
Nakajima et al.

[11] Patent Number: 6,155,290
[45] Date of Patent: Dec. 5, 2000

[54] GAS PRESSURE-REDUCING VALVE

[75] Inventors: Yoji Nakajima; Kazuki Ishikawa; Yoshio Saito, all of Kakuda; Hiroyuki Iwasaki, Urawa, all of Japan

[73] Assignee: Keihin Corporation, Tokyo, Japan

[21] Appl. No.: 09/274,244

[22] Filed: Mar. 23, 1999

[30] Foreign Application Priority Data

Mar. 24, 1998 [JP] Japan ................................. 10-075223

[51] Int. Cl.[7] ................................................ G05D 16/02
[52] U.S. Cl. ................................ 137/505.41; 137/505.42
[58] Field of Search ............................. 137/505, 505.41, 137/505.42

[56] References Cited

U.S. PATENT DOCUMENTS

| | | | |
|---|---|---|---|
| 1,701,185 | 2/1929 | Heideman | 137/505.41 |
| 3,195,568 | 7/1965 | Pearl . | |
| 3,240,223 | 3/1966 | Horst . | |
| 3,857,407 | 12/1974 | Olson | 137/495 |
| 4,257,450 | 3/1981 | Ollivier | 137/505.42 |
| 5,711,340 | 1/1998 | Gusky et al. | 137/68.19 |

FOREIGN PATENT DOCUMENTS 8-334182  12/1996  Japan .

*Primary Examiner*—Stephen Hepperle
*Attorney, Agent, or Firm*—Arent Fox Kintner Plotkin & Kahn, PLLC

[57] ABSTRACT

A gas pressure-reducing valve in which a valve member to be seated on a valve seat opened at its central portion with a valve hole leading to a pressure-reducing chamber between a body and a diaphragm is fixed on a valve stem coaxially extending through the valve hole, and in which the valve stem is fastened to a fastened member fixed on the central portion of the diaphragm. The fastened member is provided with a fitting bore opened at its one end on the side of the valve stem and a bottom threaded bore having a diameter smaller than that of the fitting bore and coaxially leading to the other end of the fitting bore. The valve stem is provided at its end portion on the side of the diaphragm with a fitting stem portion to be fitted in the fitting bore and an externally threaded portion capable of being screwed in the threaded bore and coaxially leading to the fitting stem portion. The externally threaded portion has a shorter axial length than that of the fitting bore. This arrangement makes it possible to confine the chips, as produced by screwing the valve stem into the fastened member, within the fastened member thereby to eliminate the chip removing work and to improve the assembling efficiency.

5 Claims, 14 Drawing Sheets

GAS PRESSURE-REDUCING VALVE

BACKGROUND OF THE INVENTION

1. Field of the Invention

The present invention relates to a gas pressure-reducing valve and, more particularly, to a gas pressure-reducing valve in which a valve member to be seated on a valve seat having a valve hole opened at its central portion and leading to a pressure-reducing chamber between a body and a diaphragm is fixed on a valve stem coaxiaily extending through the valve hole, and in which the valve stem is fastened to a fastened member fixed on the central portion of the diaphragm.

2. Related Art

Such a gas pressure-reducing valve has already been known in the prior art from Japanese Patent Application Laid-open No. 8-334182.

In the arrangement of the prior art, however, the fastened member fixed on the central portion of the diaphragm is provided with only a threaded bore opened toward the valve stem and an externally threaded portion formed on the end portion of the valve stem on the diaphragm side is screwed in the threaded bore. As a result, chips may be produced when the externally threaded portion is screwed in the threaded bore so as to connect the valve stem to the diaphragm. Here, the position of the valve stem fastened to the fastened member is located in the vicinity of the valve seat so that reliable seating of the valve member on the valve seat is obstructed when the chips stick to the valve seat. This makes it necessary to remove the chips at the time of assembling the pressure-reducing valve, therefore the assembling works become complicated.

SUMMARY OF THE INVENTION

The invention has been accomplished in view of the background thus far described and has an object to provide a gas pressure-reducing valve which is made possible to confine the chips which are produced by screwing a valve stem into a fastened member fixed on the diaphragm, within the fastened member thereby to eliminate the chip removing work and to improve the assembling efficiency.

In order to achieve this object, according to a first feature of the invention, there is provided a gas pressure-reducing valve comprising a diaphragm clamped at a peripheral edge portion thereof between a body and a cover fastened to the body is spring-urged toward a side which reduces the capacity of a pressure-reducing chamber formed between the diaphragm and the body, in which a valve member that can be seated on a valve seat having at a central portion thereof with a opened valve hole leading to the pressure-reducing chamber is fixed on a valve stem which is coaxially extends through the valve hole, and in which the valve stem is fastened to a fastened member fixed on the central portion of the diaphragm, wherein the fastened member is provided with a fitting bore opened at one end thereof on the side of the valve stem and a bottomed threaded bore having a diameter smaller than that of the fitting bore and coaxially leading to the other end of the fitting bore, wherein the valve stem is provided at an end portion thereof on the side of the diaphragm with a fitting stem portion fitted in the fitting bore and an externally threaded portion capable of being screwed in the threaded bore and coaxially leading to the fitting stem portion, and wherein the externally threaded portion has an axial length shorter than that of the fitting bore.

With the above arrangement of this first feature of the invention, the valve stem is fastened to the fastened member by screwing the externally threaded portion of the valve stem into the threaded bore of the fastened member. Since the axial length of the externally threaded portion is smaller than that of the fitting bore, the fitting stem portion of the valve stem has already been fitted in the fitting bore at the start of screwing the externally threaded portion into the threaded bore. Even if the chips are produced by screwing the externally threaded portion into the threaded bore, they are confined between the valve stem and the fastened member. This makes it unnecessary to remove the chips thereby to improve the assembling efficiency.

In addition to the first aspect, according to a second feature of the invention, a coil spring for urging the diaphragm in the direction for reducing the capacity of the pressure-reducing chamber is accommodated in a spring chamber formed between the cover and the diaphragm, the cover is provided with an accommodation bore which is opened at an outer end thereof for insertion and removal of the coil spring and is disposed coaxially with the valve hole, an adjust screw for adjusting the spring load of the coil spring in accordance with a position of the adjust screw advanced and retreated in the axial direction is screwed in an outer end opening of the accommodation bore, and an end portion of the coil spring on the side opposed to the diaphragm is received by the adjust screw.

With the above arrangement of this second feature, the end portion of the coil spring on the side opposed to the diaphragm is directly received by a recess formed in the adjust screw, so that a retainer can be eliminated to reduce the number of parts. Moreover, the adjust screw is screwed in the outer end opening of the accommodation bore formed in the cover for accommodating the coil spring. When the pertheral edge portion of the diaphragm is to be clamped between the body and the cover, therefore, the coil spring can be removed from the cover so that the cover can be fastened to the body while preventing any offset load from acting on the diaphragm. As a result, the valve member can be reliably seated on the valve seat while preventing the diaphragm from any dislocation thereby to prevent a deterioration in the pressure regulation.

In addition to the second feature, according to a third feature of the invention, the adjust screw is provided with a guide portion for guiding the end portion of the coil spring on the side opposed to the diaphragm. With the above arrangement of this third feature, when the coil spring is accommodated in the cover and compressed by the adjust screw, the end portion of the coil spring on the side opposed to the diaphragm can be guided by the guide portion while preventing the coil spring from any inclination.

In addition to the first feature, according to a fourth feature of the invention, a diaphragm retainer is fixed at the central portion of the diaphragm on the side of a spring chamber formed between the cover and the diaphragm, an outer peripheral portion of the diaphragm retainer has such an external diameter that permits its outer peripheral edge to be located close to and opposed to an inner surface of the cover, the outer peripheral portion is formed of a curved shape to bulge toward the spring chamber. With the above arrangement of this fourth feature, the outer peripheral portion of the diaphragm retainer is formed of a curved shape to bulge toward the spring chamber so that the deflection of the diaphragm toward the spring chamber is regulated by the curved shape of the outer peripheral portion of the diaphragm retainer when the pressure in the pressure-reducing chamber exceeds a predetermined level. Since the outer edge of the diaphragm retainer is positioned close to and opposed to the inner surface of the cover, moreover, the diaphragm is smoothly curved from diaphragm retainer to the inner surface of the cover so that it can be prevented from being bent toward the spring chamber, thereby to have an improved durability.

In addition to the fourth feature, according to a fifth feature of the invention, the diaphragm is made with a larger thickness, at its portion corresponding to a clearance between the outer peripheral edge of the diaphragm retainer and the inner peripheral surface of the cover, than the clearance. With the arrangement of this fifth feature, the diaphragm can be reliably prevented from coming into the clearance between the outer peripheral edge of the diaphragm retainer and the inner peripheral surface of the cover and being bent thereby.

The foregoing and other objects, features and advantages of the invention will become apparent from the following detailed description on its preferred embodiment with reference to the accompanying drawings.

BRIEF DESCRIPTION OF THE DRAWINGS

FIGS. 1 to 15 show one embodiment of the present invention in which:

FIG. 1 is a schematic diagram showing an arrangement of a fuel supply system of a vehicle;

FIG. 2 is a side view of a regulator;

FIG. 3 is a top plan view of the regulator;

FIG. 4 is a sectional view taken along a line 4—4 in FIG. 3;

FIG. 5 is a sectional view taken along a line 5—5 in FIG. 4;

FIG. 6 is an enlarged longitudinal sectional view of an electromagnetic cut-off valve;

FIG. 7 is a diagram illustrating the suction characteristics of the electromagnetic cut-off valve;

FIG. 8 is an enlarged longitudinal sectional view of a primary pressure-reducing valve;

FIG. 9 is an enlarged sectional view taken along a a line 9—9 in FIG. 8;

FIG. 10 is an enlarged view of an essential portion of FIG. 8;

FIG. 11 is a diagram showing the pressure reducing characteristics of the primary pressure-reducing valve in accordance with the ambient temperature;

FIG. 12 is a diagram showing the hysteresis characteristics depending upon the number of O-rings to be fitted on a piston;

FIG. 13 is an enlarged longitudinal sectional view of a secondary pressure-reducing valve;

FIG. 14 is a sectional view taken along a line 14—14 in FIG. 13; and

FIG. 15 is a longitudinally sectional side view taken along a line 15—15 in FIG. 14 but with only the cap being cut.

DESCRIPTION OF THE PREFERRED EMBODIMENT

Figure 1:
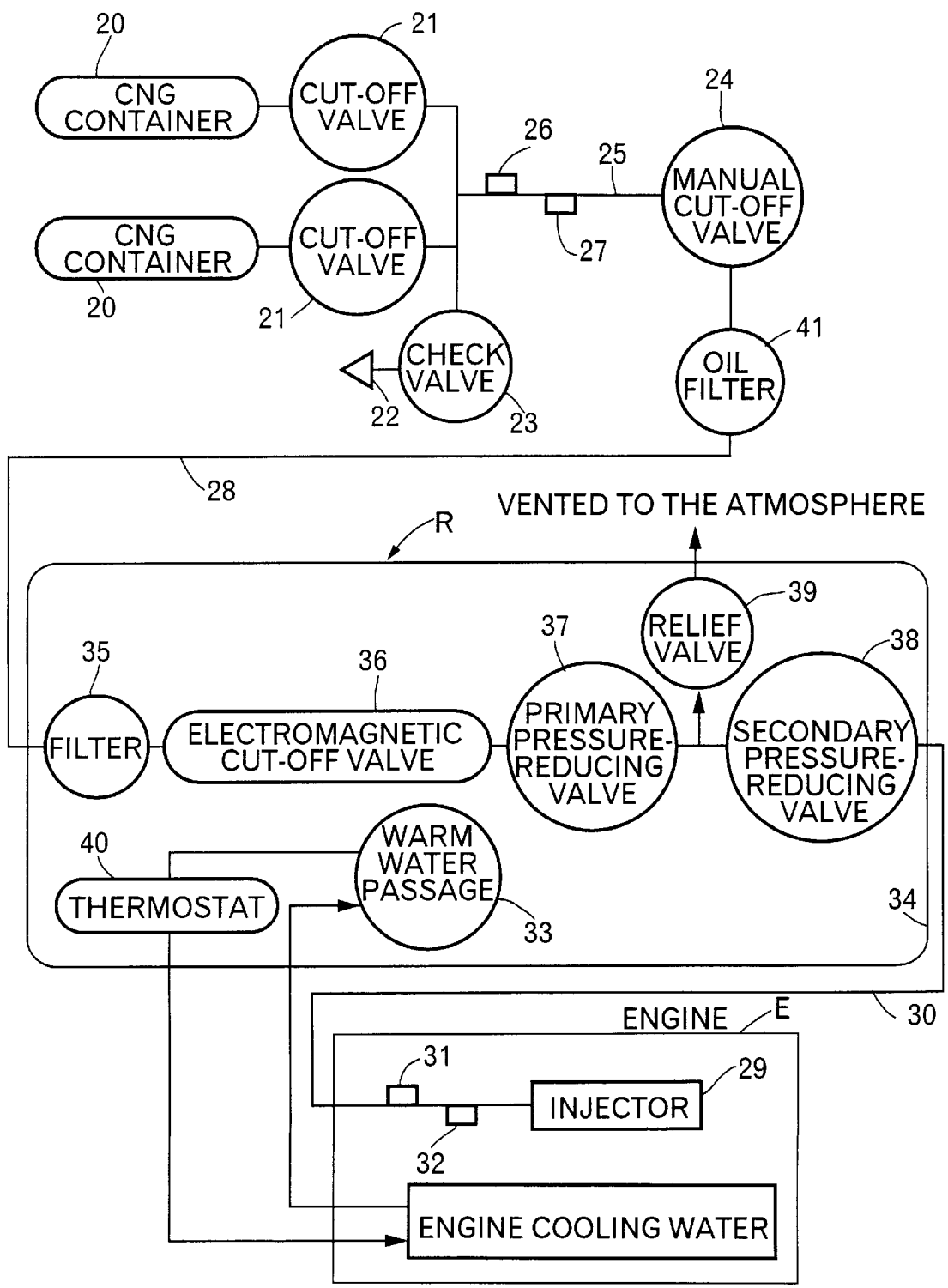
Figure 2:
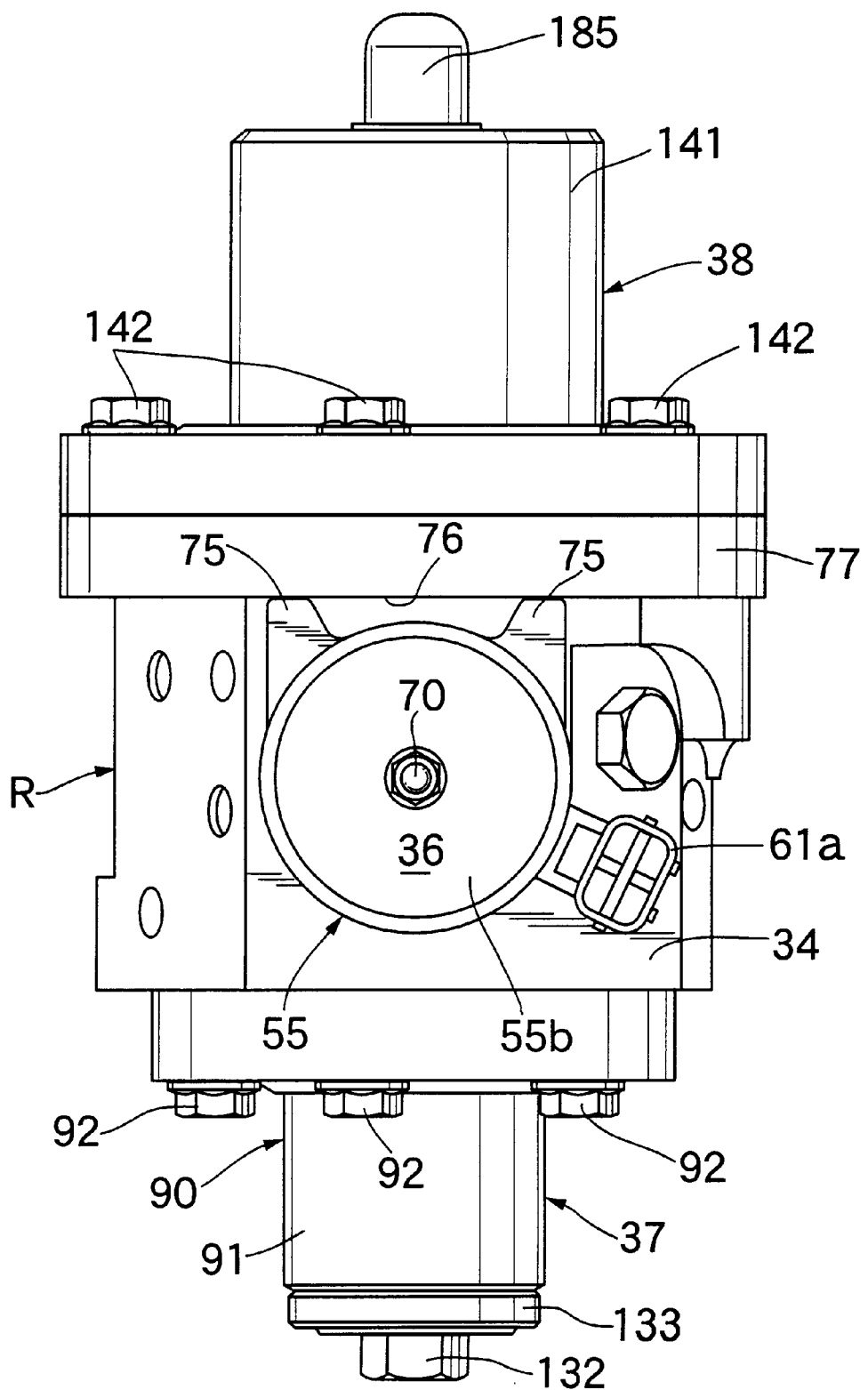
Figure 3:
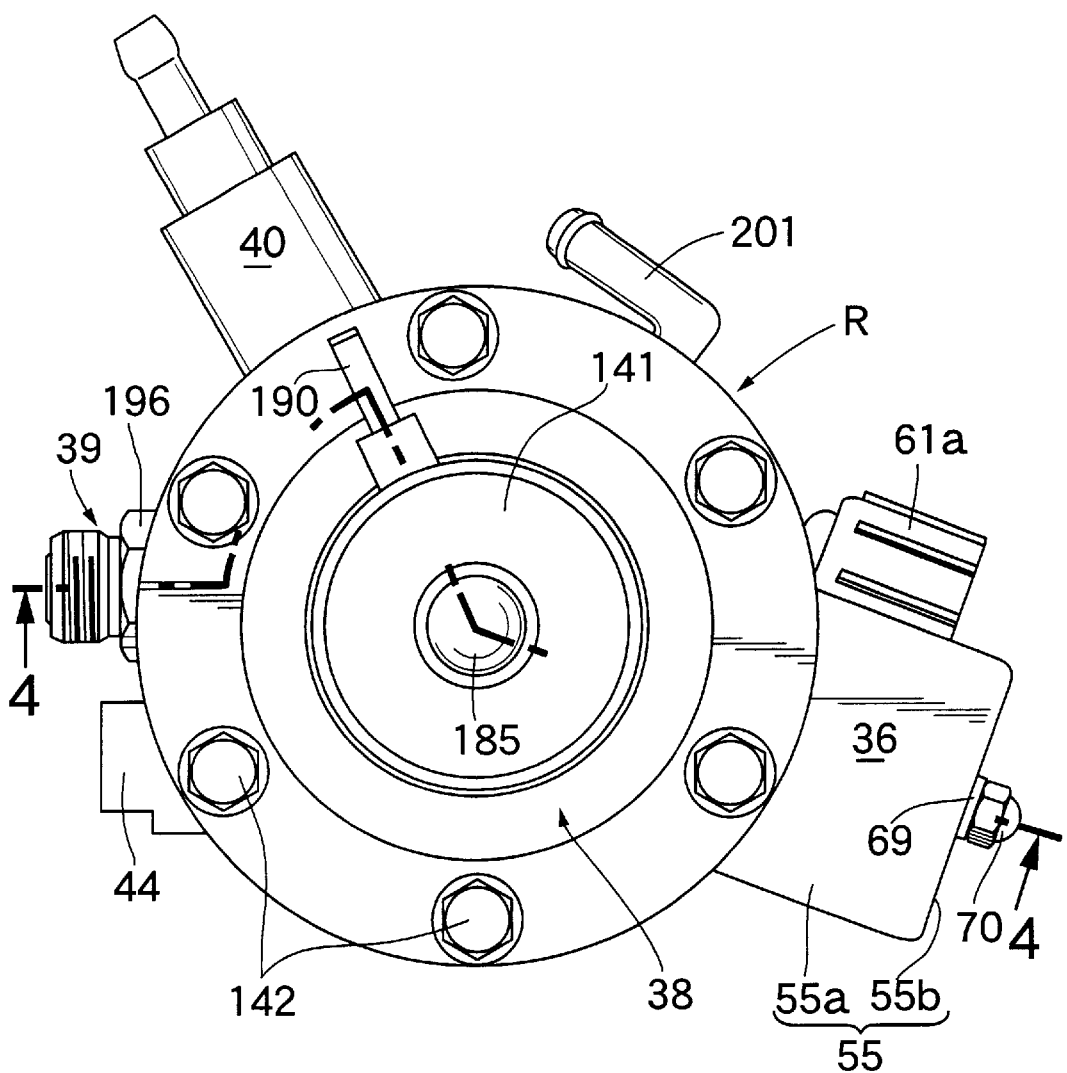

One embodiment of the invention will be described with reference to FIGS. 1 to 15. First of all, as shown in FIG. 1, the compressed natural gas (as will be shortly referred to as the "CNG") is reserved under pressures such as 250 to 10 $Kg/cm^2$ in one or more CNG containers 20. These CNG containers 20 are individually provided with container cut-off valves 21 which are commonly connected with a charge port 22 through a check valve 23 and further with a manual cut-off valve 24. A conduit 25 between the individual container cut-off valves 21 and the manual cut-off valve 24 is provided with a pressure sensor 26 and a temperature sensor 27.

When the container cut-off valves 21 and the manual cut-off valve 24 are to be opened, the CNG from the CNG containers 20 is introduced via a conduit 28, which is provided with an oil filter 41 for filtering off such oil as might otherwise immigrate at the time of charging the CNG containers 20 with the CNG by compressor, into a regulator R. The CNG, as regulated to 2 to 3 $Kg/cm^2$ by the regulator R, is further introduced into the injector 29 of an engine E via a conduit 30. This conduit 30 is provided with a temperature sensor 31 and a pressure sensor 32.

With additional reference to FIGS. 2 to 5, the regulator R is constructed by arranging a filter 35, an electromagnetic cut-off valve 36, a primary pressure-reducing valve 37, a secondary pressure-reducing valve 38, a relief valve 39 and a thermostat 40 in their common body 34 having a warm water passage 33.

The filter 35 filters out the impurity which is contained in the CNG introduced via the conduit 28 leading from the manual cut-off valve 24. The electromagnetic cut-off valve 36 acts to cut off the communication between the filter 35 and the primary pressure-reducing valve 37 in response to the stop of the run of the engine E thereby to stop the feed of the CNG.

The primary pressure-reducing valve 37 acts to reduce the CNG having a pressure as high as 250 to 10 $Kg/cm^2$ and coming from the CNG containers 20, to 6 to 7 $Kg/cm^2$, for example. The secondary pressure-reducing valve 38 acts to reduce the CNG coming from the primary pressure-reducing valve 37, to 2 to 3 $Kg/cm^2$, for example. The CNG from the secondary pressure-reducing valve 38 is introduced via the conduit 30 into the injector 29.

The relief valve 39 is connected between the primary pressure-reducing valve 37 and the secondary pressure-reducing valve 38, and is opened to release the CNG, which has been pressure-reduced by the primary pressure-reducing valve 37 and introduced into the secondary pressure-reducing valve 38, to the atmosphere when the pressure of the CNG rises to overcome a preset valve opening level such as 16.5 $Kg/cm^2$.

Into the warm water passage 33 of the body 34, moreover, there is introduced the engine cooling water from the engine E so that the temperature of the body 34 may not become excessively low in accordance with the pressure-reducing actions of the primary and secondary pressure-reducing valves 37 and 38. The thermostat 40 is arranged in the body 34 on the return side of the engine cooling water from the warm water passage 33 to the engine E, and acts to close, when the engine cooling water to flow to the warm water passage 33 exceeds 80 degrees, for example, thereby to prevent the temperature of the body 34 from rising to a higher level.

Here will be sequentially described the constructions and operations of the filter 35, the electromagnetic cut-off valve 36, the primary pressure-reducing valve 37, the secondary pressure-reducing valve 38, the relief valve 39 and the thermostat 40.

Filter 35

Figure 5:
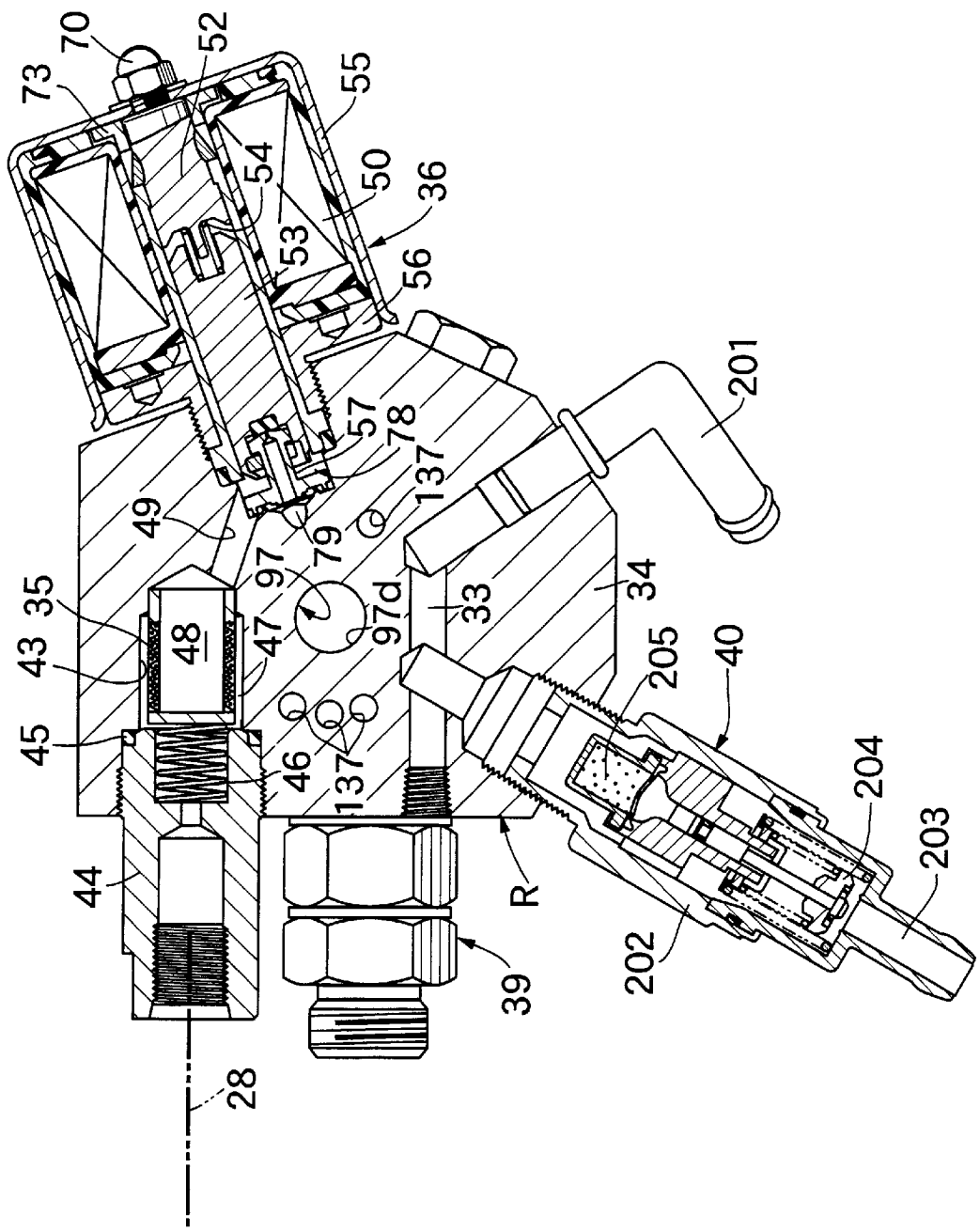

With especial reference to FIG. 5, a recess 43 is formed in the side portion of the vertically intermediate portion of the body 34. A tube fitting 44 is so fastened in the outer end opening of the recess 43 as to clamp an annular seal member 45 between its inner end and the body 34. The conduit 28 for introducing the CNG from the manual cut-off valve 24 is connected to the outer end portion of the tube fitting 44. The filter 35 is fitted in the recess 43 at a clearance from the inner end of the tube fitting 44. Between the filter 35 and the tube fitting 44, there is interposed a spring 46 for generating an elastic force to urge the filter 35 to the inner end closed portion of the recess 43.

Between the outer circumference of the filter 35 fitted in the recess 43 and the body 34, there is formed an annular unpurification chamber 47 which is communicating with the inside of the tube fitting 44. The body 34 is provided with a passage 49 which communicates with a purification chamber 48 in the filter 35. Thus, the CNG which contains the impurity introduced via the conduit 28, flows from the unpurification chamber 47 through the filter 35, at which the impurity is removed, into the purification chamber 48 and further into the passage 49.

Electromagnetic Cut-off Valve

Figure 6:
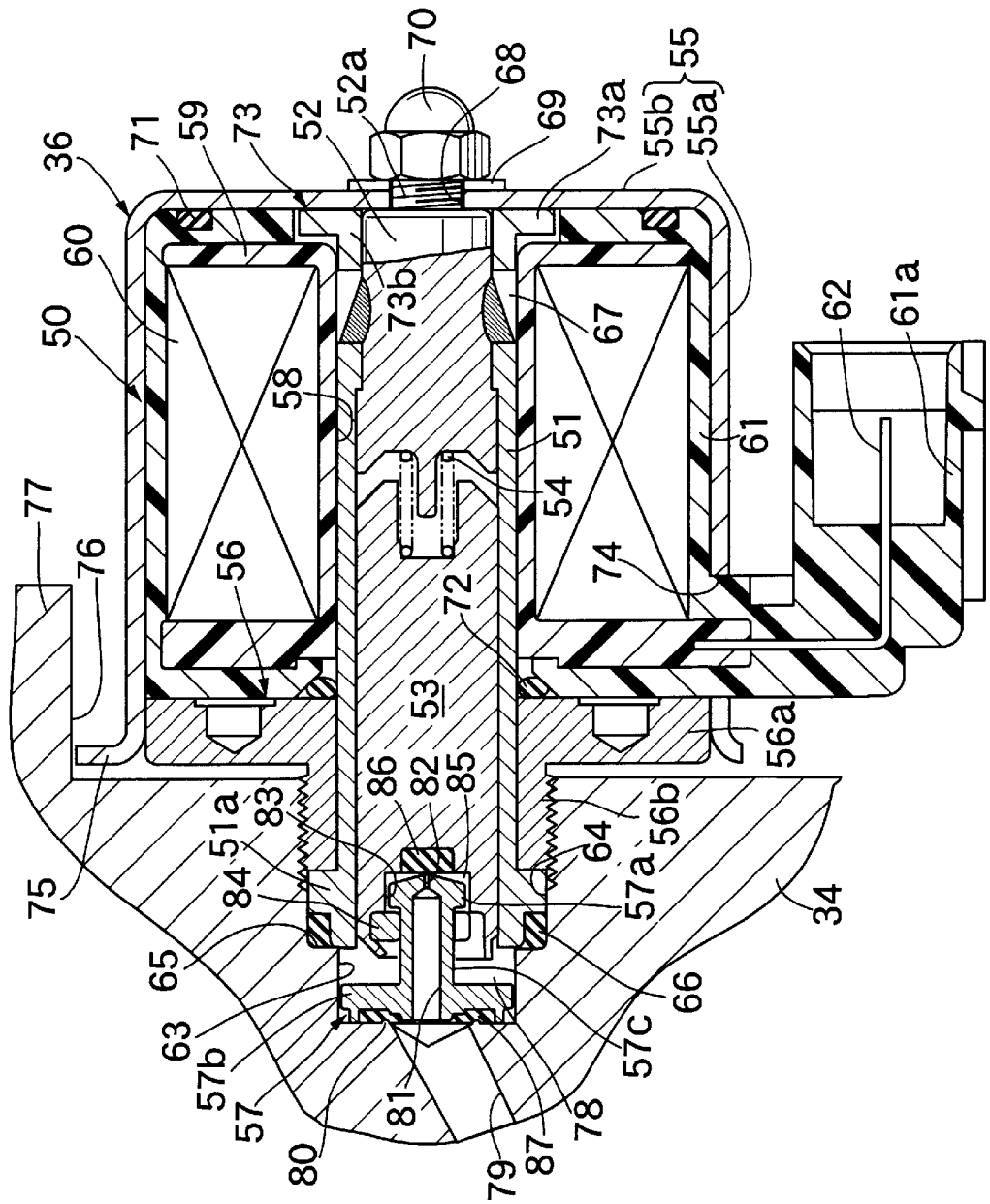

With additional reference to FIG. 6, the electromagnetic cut-off valve 36 is mounted on the side portion of the body 34 at a position circumferentially spaced from the fastened position of the tube fitting 44 and at a vertical position corresponding to the filter 35.

This electromagnetic cut-off valve 36 is constructed to include: a coil assembly 50; a guide cylinder 51 made of a non-magnetic material and having one end side inserted into the coil assembly 50 and the other end side fixed on the body 34; a stationary core 52 so fixed in the guide cylinder 51 as to close one end of the guide cylinder 51; a plunger 53 slidably fitted in the guide cylinder 51 while confronting the stationary core 52; a return spring 54 interposed between the stationary core 52 and the plunger 53; a solenoid housing 55 made of a magnetic metal and so fastened on the stationary core 52 as to cover the coil assembly 50; a magnetic support frame 56 so fastened in the body 34 as to interpose the coil assembly 50 between itself and the solenoid housing 55; and a valve member 57 held on the plunger 53 on the side opposed to the stationary core 52.

The coil assembly 50 is constructed by coating a bobbin 59 made of a synthetic resin and having a center bore 58 and a coil 60 to be wound on the bobbin 59, with a coating portion 61 of a synthetic resin. The coating portion 61 is integrated at its portion on the side of the body 34 with a coupler portion 61a confronting a pair of connection terminals 62 leading to the coil 60. This coupler portion 61a is connected with the not-shown lead wire.

In the body 34, there are so formed a diametrically smaller bore 63 having a closed inner end and a diametrically larger bore 64 having a larger diameter than that of the diametrically smaller bore 63 and coaxially leading to the outer end of the diametrically smaller bore 63, as to form an annular stepped portion 65 facing the outside between the two bores. On the outer face of the outer end side of the guide cylinder 51 to be inserted at its one end side into the center bore 58 of the bobbin 59, there is integrally mounted a flanged portion 51a which faces the inner face of the diametrically larger bore 64 at its outer circumference such that it bulges radially outward. The other end portion of the guide cylinder 51 is so inserted into the diametrically larger bore 64 as to interpose an annular seal member 66 between the flanged portion 51a and the stepped portion 65.

The magnetic support frame 56 is equipped with: a ring plate portion 56a enclosing the portion, as protruded from the coil assembly 50 to the body 34, of the guide cylinder 51 and abutting against the end face of the coil assembly 50 on the side of the body 34; and a cylindrical portion 56b integrally leading from the inner circumference of the ring plate portion 56a and enclosing the guide cylinder 51. The magnetic support frame 56 is assembled with the body 34 by screwing the cylindrical portion 56b into the diametrically larger bore 64. Moreover, the seal member 66 and the flanged portion 51a are clamped between the stepped portion 65 and the leading end of the cylindrical portion 56b so that the guide cylinder 51 is fixed in the body 34.

The stationary core 52 is formed of a magnetic metal into a rod shape having a circular transverse section and is so fixed in the guide cylinder 51 by the welding method or the like that its outer end is protruded from one end of the guide cylinder 51 whereas its inner end is fitted in one end portion of the guide cylinder 51. At this time, the radially bulging flanged portion 51a is formed on the other end side of the guide cylinder 51 so that the mounting of the magnetic support frame 56 and the coil assembly 50 on the guide cylinder 51 has to be carried out from the one end side of the guide cylinder 51, i.e., from the side of the stationary core 52. In order that the fixed portion of the guide cylinder 51 and the stationary core 52 may not protrude from the outer face of the guide cylinder 51, the external diameter of the portion of the stationary core 52 protruding from the guide cylinder 51 is set smaller than that of the guide cylinder 51. As a result, an annular clearance 67 is formed between the one end side inner face of the center bore 58 in the coil assembly 50 and the outer circumference of the stationary core 52. On the other hand, the outer end face of the stationary core 52 is arranged at the substantially same position as that of the one end face of the coil assembly 50 along the axis of the guide cylinder 51.

The solenoid housing 55 is formed into a bottomed cylindrical shape which is integrally provided with a cylindrical portion 55a enclosing the coil assembly 50 and an end plate portion 55b extended from one end portion of the cylindrical portion 55a. The central portion of the end plate portion 55b is in abutment against the outer end face of the stationary core 52. From the stationary core 52, moreover, there is coaxially and integrally extended a threaded stem portion 52a projecting outward from the outer end face of the stationary core 52. At the center of the end plate portion 55b, there is formed an insert hole 68 for inserting the threaded stem portion 52a. Thus, a cap nut 70 is screwed on the protrusion of the threaded stem portion 52a from the end plate portion 55b while sandwiching a washer 69 between the cap nut 70 and the outer face of the end plate portion 55b. When this cap nut 70 is fastened, the end plate portion 55b, i.e., the central portion of the closed end of the solenoid housing 55 is fastened to the stationary core 52.

By thus fastening the solenoid housing 55 on the stationary core 52, the coil assembly 50 is clamped between the end plate portion 55b of the solenoid housing 55 and the ring plate portion 56a of the magnetic support frame 56. In order to prevent an excessive load from acting on the coil assembly 50 by fastening the solenoid housing 55, there is mounted on one end face of the coil assembly 50 an annular elastic member 71 for elastically contacting with the inner face of the end plate portion 55b, and an annular elastic member 72 is interposed between the inner circumference of the other end portion of the coil assembly 50 and the magnetic support frame 56.

On the inner face of the end plate portion 55b of the solenoid housing 55, there is fixed by a spot-welding method or the like a magnetic path forming member 73 which is made of a magnetic metal. This magnetic path forming member 73 is provided with a ring plate portion 73a enclosing the stationary core 52 and abutting against the inner face of the end plate portion 55b, and a cylindrical portion 73b extending coaxially and integrally at its one end from the inner circumference of the ring plate portion 73a. The cylindrical portion 73b encloses the stationary core 52 while being magnetically coupled to the stationary core 52, the other end portion of the cylindrical portion 73b is inserted into the annular clearance 67 which is formed between the coil assembly 50 and the stationary core 52.

In the other end side of the cylindrical portion 55a of the solenoid housing 55, there is formed a notch 74 for protruding the coupler portion 61a, as integrated with the coating portion 61 of the coil assembly 50, to the outside. Over the electromagnetic cut-off valve 36, there bulges from the body 34 a disk-shaped flanged portion 77 for mounting the secondary pressure-reducing valve 38. The face of this flanged portion 77 on the side of the electromagnetic cut-off valve 36 provides a flat regulation wall 76 confronting the other end side of the cylindrical portion 55a of the solenoid housing 55 of the electromagnetic cut-off valve 36. On the other hand, the cylindrical portion 55a is provided at its other end with a pair of engagement pawls 75 and 75 protruding toward the regulation wall 76. When these engagement pawls 75 and 75 come into engagement with the regulation wall 76, the solenoid housing 55 is prevented from turning on the axis of the threaded stem portion 52a of the stationary core 52.

Here, the guide cylinder 51 is fixed in the body 34 with its other end side being inserted in the diametrically larger bore 64, and the plunger 53 is slidably fitted in the guide cylinder 51. As a result, a main valve chamber 78 is formed between the closed inner end portion of the diametrically smaller bore 63 of the body 34 and the other ends of the guide cylinder 51 and the plunger 53. Moreover, the passage 49 leading to the purification chamber 48 of the filter 35 communicates with the main valve chamber 78 so that the CNG, as purified by the filter 35, is introduced into the main valve chamber 78.

In the body 34, on the other hand, there is formed a passage 79 to be opened at the center in the closed inner end portion of the diametrically smaller bore 63. In the body 34, there is further provided an annular valve seat 80 which is so slightly protruded toward the main valve chamber 78 as to enclose the open end of that passage 79 into the main valve chamber 78.

The valve member 57 is constructed by integrating a one end side pilot valve portion 57a, which is formed into a disk shape having on its one end face a taper face converging toward the plunger 53, and an other end side main valve portion 57b, which is formed into a disk shape confronting the closed inner end portion of the diametrically smaller bore 63, through a connecting cylindrical portion 57c forming a step between the two valve portions 57a and 57b. The diameter of the pilot valve portion 57a is set smaller than that of the main valve portion 57b. In the central portion of this valve member 57, there are coaxially formed a first passage 81 communicating with the passage 79 at all times, and a second passage 82 opened into the central portion of the one end face of the pilot valve portion 57a via the first passage 81. The second passage 82 is formed to have a smaller diameter than that of the first passage 81.

In the end portion of the plunger 53, as confronting the main valve chamber 78, there is formed a recess 83 for receiving the pilot valve portion 57a. This pilot valve portion 57a is so loosely inserted into the recess 83 that it is prevented from coming out of the recess 83 by a C-shaped stop ring 84 fixed on the other end of the plunger 53.

Between the pilot valve portion 57a and the plunger 53, there is formed a pilot valve chamber 85 having communication with the main valve chamber 78. In the central portion of the closed end of the recess 83, there is buried a rubber seal 86 for sealing the opening of the second passage 82 into the pilot valve chamber 85 when it seats the central portion of the one end face of the pilot valve portion 57a. Thus, the stop ring 84 is fixed on the plunger 53 at such a position that the pilot valve portion 57a can axially move relative to the plunger 53 between the closed end of the recess 83 and the stop ring 84.

In the face, as confronting the closed end of the diametrically smaller bore 63, of the main valve portion 57b, there is buried an annular rubber seal 87 to be seated on the valve seat 80 to shut the communication between the main valve chamber 78 and the passage 79.

In the electromagnetic cut-off valve 36 thus constructed, at a stop of the engine E, with the coil 60 being demagnetized, the plunger 53 is moved apart from the stationary core 52 by the action of the return spring 54, so that the rubber seal 87 of the main valve portion 57b is seated on the valve seat 80 to shut the communication between the main valve chamber 78 and the passage 79 and so that the pilot valve portion 57a is seated on the rubber seal 86 to shut the communication between the pilot valve chamber 85 and the passage 79. As a result, the feed of the CNG at a high pressure to the passage 79 is stopped.

When the coil 60 is magnetized at the time of starting the engine E, on the other hand, the plunger 53 moves at first to such a stroke toward the stationary core 52 as to bring the pilot valve portion 57a away from the rubber seal 86, so that the second passage 82 communicating with the passage 79 via the first passage 81 establishes communication with the pilot valve chamber 85. As a result, the CNG gradually flows from the main valve chamber 78 via the pilot valve chamber 85, the second passage 82 and the first passage 81 into the passage 79 thereby to reduce the difference between the pressures acting on the main valve portion 57b from the sides of the main valve chamber 78 and the passage 79. When the electromagnetic force by the coil 60 overcomes the pressure difference acting on the main valve portion 57b, the plunger 53 farther moves toward the stationary core 52, and the rubber seal 87 of the main valve portion 57b leaves the valve seat 80 so that the CNG flows from the main valve chamber 78 to the passage 79.

In the electromagnetic cut-off valve 36, moreover, the central portion of the end plate portion 55b of the solenoid housing 55 is fastened to the stationary core 52, but the engagement pawls 75 and 75, as integral with the cylindrical portion 55a of the solenoid housing 55, come into engagement with the regulation wall 76 of the body 34. As a result, the solenoid housing 55 is prevented from turning on the fastened portion of its end plate portion 55b to the stationary core 52 by the engagement of the pawls 75 and 75 with the regulation wall 76. Thus, the turn of the solenoid housing 55 can be prevented by the simple structure in which it is unnecessary to increase the strength of fastening the solenoid housing 55 to the stationary core 52. The circumference of the coupler portion 61a, as protruded to the outside from the notch 74 formed in the cylindrical portion 55a of the solenoid housing 55, can also be prevented from going out of position so that no undesired external force is applied to the lead wire connected to the coupler portion 6/a. Moreover, the regulation wall 76 is a face of such a disk-shaped flanged portion 77 on the side of the electromagnetic cut-off valve 36 as to mount the secondary pressure-reducing valve 38 on the body 34. Thus, the regulation wall 76 need not be elaborately formed, but the solenoid housing 55 can be arranged the closest to the center of the body 34 thereby to make a contribution to a size reduction of the regulator R.

On the other hand, the annular clearance 67 is formed between the outer face of the stationary core 52 and the inner face of the center bore 58 of the coil assembly 50. The magnetic path forming member 73, which is provided with the ring plate portion 73a abutting against the closed end of the solenoid housing 55, i.e., the inner face of the end plate portion 55b, and the cylindrical portion 73b extending coaxially and integrally at its one end from the inner circumference of the ring plate portion 73a and enclosing the stationary core 52 in the magnetically coupling manner, is so fixed in the solenoid housing 55 that the other end portion of the cylindrical portion 73b is inserted into the clearance 67. The magnetic path forming member 73 thus constructed is arranged between the solenoid housing 55 and the stationary core 52 so that the area of the magnetic path between solenoid housing 55 and the stationary core 52 takes such a relatively large value or the sum of the area corresponding to the outer end face of the stationary core 52 and the area of the outer circumference of the stationary core 52 at the portion to be enclosed by the cylindrical portion 73b of the magnetic path forming member 73. Thus, the magnetic path area between the solenoid housing 55 and the stationary core 52 can be sufficiently enlarged.

Figure 7:
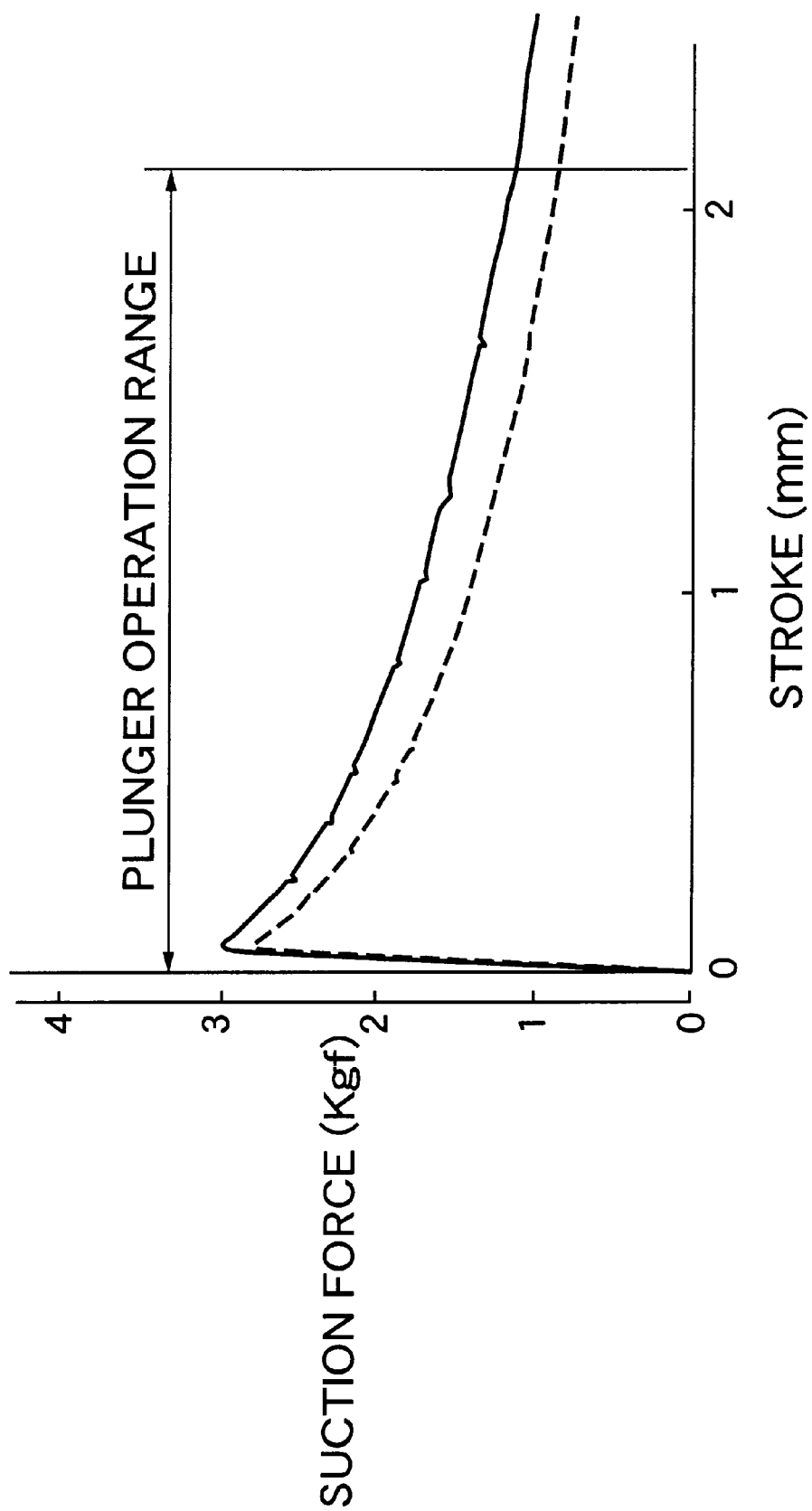

As a result, the structure having only the annular clearance 67 exhibits the suction characteristics, as illustrated by a broken curve in FIG. 7, but the structure having the magnetic path forming member 73 inserted into the clearance 67 can provide the excellent suction characteristics, as illustrated by a solid curve in FIG. 7.

Primary Pressure-Reducing Valve 37

Figure 8:
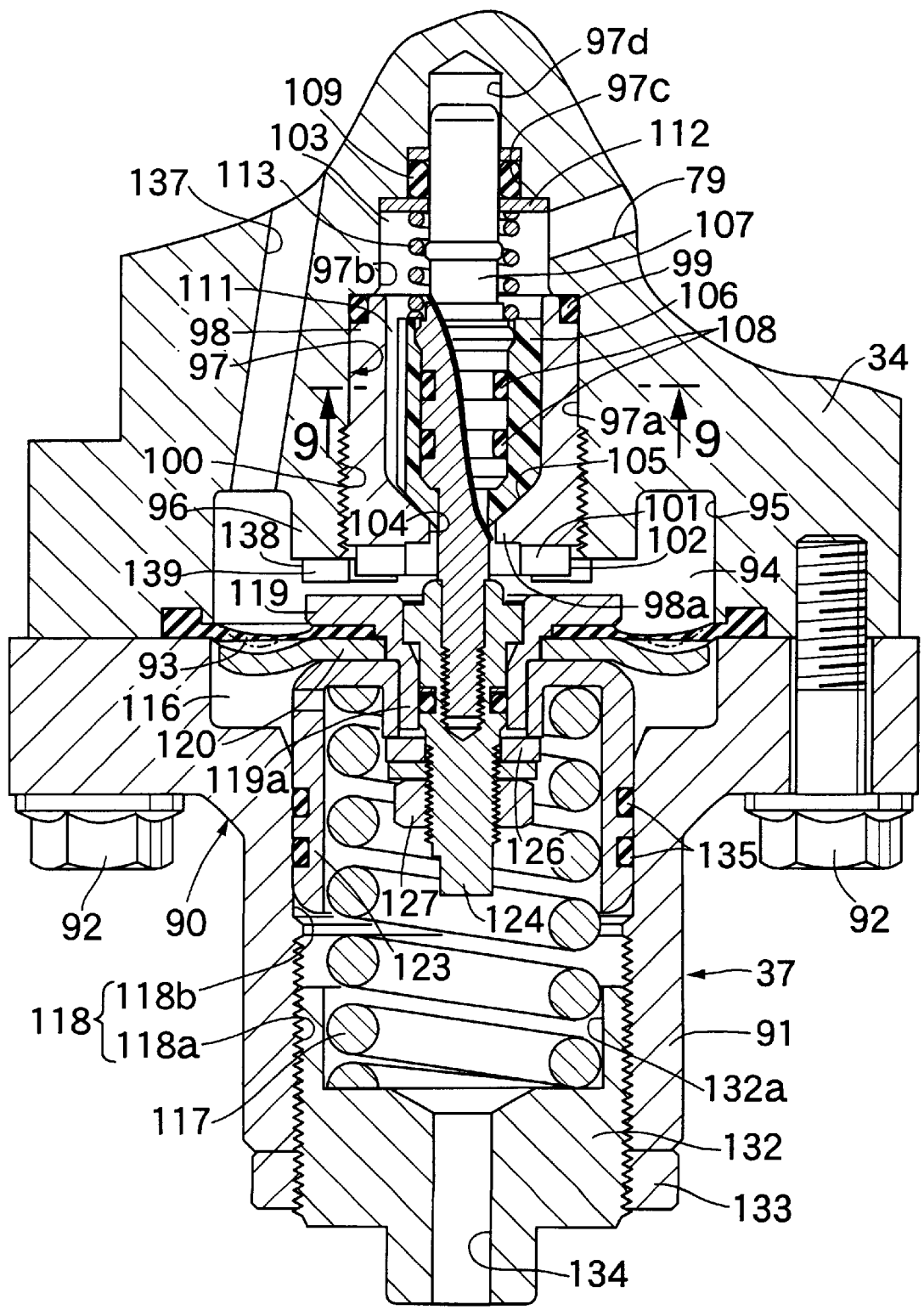

In FIG. 8, a valve housing 90 of the primary pressure-reducing valve 37 is constructed of the lower portion of the body 34 and a cover 91 fastened to the lower face of the body 34 by means of a plurality of bolts 92. A diaphragm 93 is clamped at its circumferential edge portion between the lower face of the body 34 and the cover 91.

In the lower face of the body 34, there is formed a recess 95 which forms a pressure-reducing chamber 94 between itself and the diaphragm 93. On the central portion at the closed end of the recess 95, there is formed a round rising portion 96 protruding toward the diaphragm 93.

In the body 34, there is vertically extended a bottomed mounting bore 97 which is opened at its lower end toward the pressure-reducing chamber 94 and closed at its upper end. This mounting bore 97 is formed of: a first bore portion 97a opened at its lower end into the center portion of the lower end of the rising portion 96; a second bore portion 97b made diametrically smaller than the first bore portion 97a and coaxially leading at its lower end to the upper end of the first bore portion 97a; a third bore portion 97c made diametrically smaller than the second bore portion 97b and coaxially leading at its lower end to the upper end of the second bore portion 97b; and a fourth bore portion 97d made diametrically smaller than the third bore portion 97c and coaxially leading at its lower end to the upper end of the third bore portion 97c while its upper end being closed. The passage 79 for guiding the CNG from the electromagnetic cut-off valve 36 is opened in the inner face of the second bore portion 97b.

A cylindrical valve seat member 98 is so screwed in the first bore portion 97a of the mounting bore 97 that an annular seal member 99 is clamped between the valve seat member 98 and the stepped portion between the first and second bore portions 97a and 97b. Specifically, in the inner face of the lower portion of the first bore portion 97a of the mounting bore 97, there is formed an internal thread 100, in which the valve seat member 98 is screwed.

On the end face of the valve seat member 98 on the side of the pressure-reducing chamber 94, moreover, there are formed a plurality of, e.g., four ridges 102 for forming inbetween a plurality of, e.g., four grooves 101 extending radially of the valve seat member 98 in a plane normal to the axis of the mounting bore 97. These grooves 101 are arranged in the shape of a cross. When the valve seat member 98 is to be fastened in the internal thread 100, the not-shown tool can be applied to the cross-shaped grooves 101 to turn the valve seat member 98 so that the valve seat member 98 can be easily mounted on the body 34.

Between the valve seat member 98 and the closed portion of the upper end of the mounting bore 97, there is formed a valve chamber 103 communicating with the passage 79. On the other hand, the valve seat member 98 is integrally provided at its end portion on the side of the pressure-reducing chamber 94 with an inward flange 98a extending radially inward. In the inner circumference of this inward flange 98a, there is formed a valve hole 104 communicating with the pressure-reducing chamber 94. On the inner face of the inward flange 98a, there is formed a taper valve seat 105 which confronts the valve chamber 103 while opening the valve hole 104 in the central portion.

Figure 9:
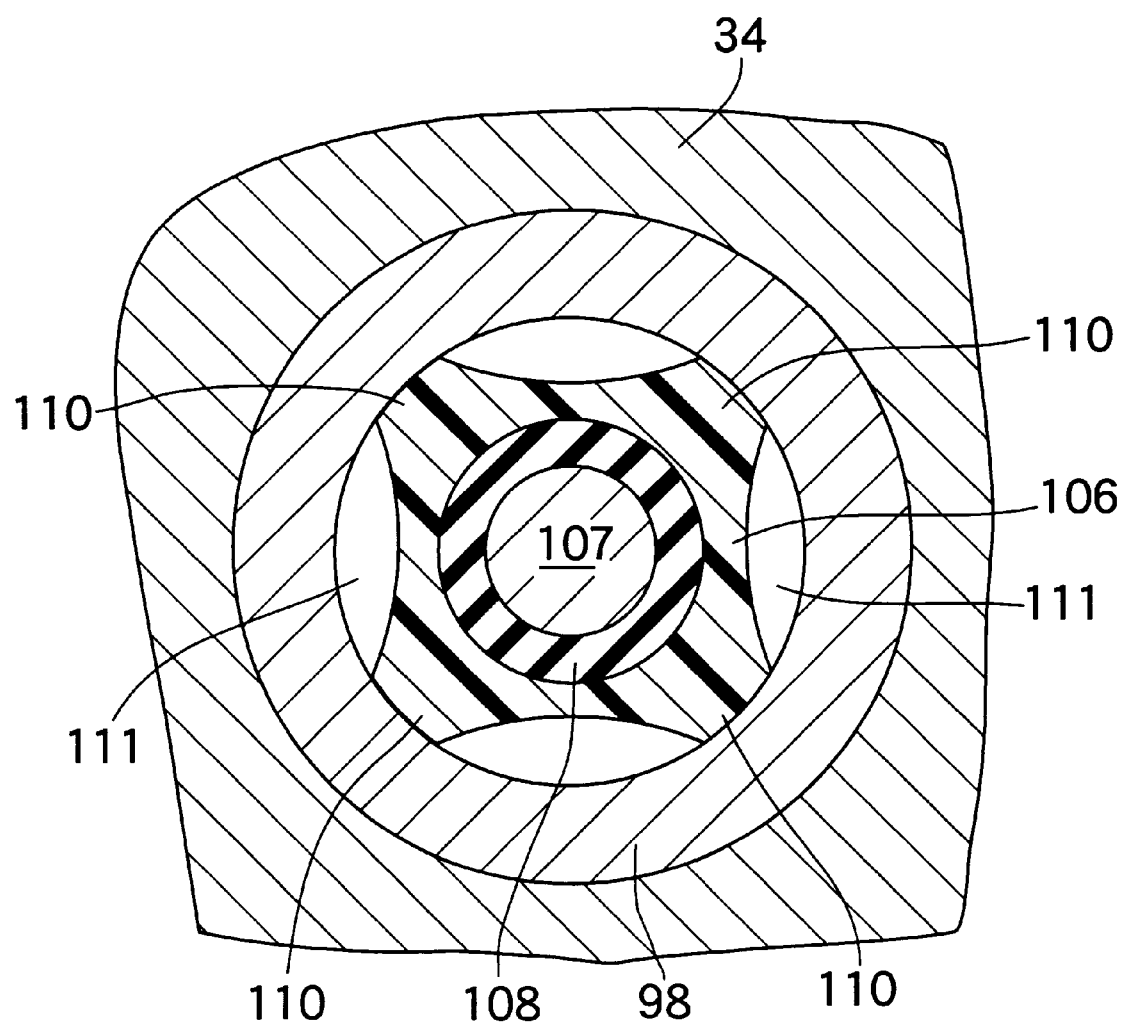

With additional reference to FIG. 9, there is fitted in the valve chamber 103 a valve member 106 of a synthetic resin, which can be seated on the valve seat 105. This valve member 106 is fixed on a valve stem 107 which is arranged coaxially with the valve hole 104.

The valve member 106 is formed into such a cylindrical shape by tapering its one end face confronting the taper valve seat 105 that it may be seated on the valve seat 105. The valve member 106 is fixed on the valve stem 107 by fitting the valve stem 107 elastically in the valve member 106. On the outer face of the valve stem 107 at axially spaced positions, moreover, there are mounted a pair of O-rings 108 and 108 which elastically contact with the inner face of the valve member 106.

The valve stem 107 is so borne at its one end portion in the body 34 that it is allowed to move axially by a bearing 109 interposed between the valve stem 107 and the inner face of the third bore portion 97c of the mounting bore 97. On the outer face of the valve member 106, on the other hand, there are formed a plurality of, e.g., four guide portions 110 which are equally spaced in the circumferential direction and brought into sliding contact with the inner face of the valve seat member 98. Between the individual guide portions 110 and between the valve member 106 and the valve seat member 98, there are formed communication passages 111 which extend in the axial direction of the valve stem 107.

A retainer 112 for retaining the bearing 109 between itself and the stepped portion between the third and fourth bore portions 97c and 97d of the mounting bore 97 is in abutment against the stepped portion between the second and third bore portions 97b and 97c. A spring 113 is interposed under compression between the retainer 112 and the valve member 106.

Between the cover 91 and the diaphragm 93, there is formed a spring chamber 116, in which a coil spring 117 for urging the diaphragm 93 toward the pressure-reducing chamber 94 is accommodated.

The cover 91 is provided with an accommodation bore 118 which extends coaxially with the valve hole 104 and which is opened at its outer end. This accommodation bore 118 is formed of a threaded bore portion 118a on the axially outer side, and a sliding bore portion 118b on the axially inner side, which is made diametrically larger than the threaded bore portion 118a and coaxially leading to the threaded bore portion 118a. Moreover, the internal diameter of the accommodating bore 118 is set to such a value as can put in and out the coil spring 117.

Figure 10:
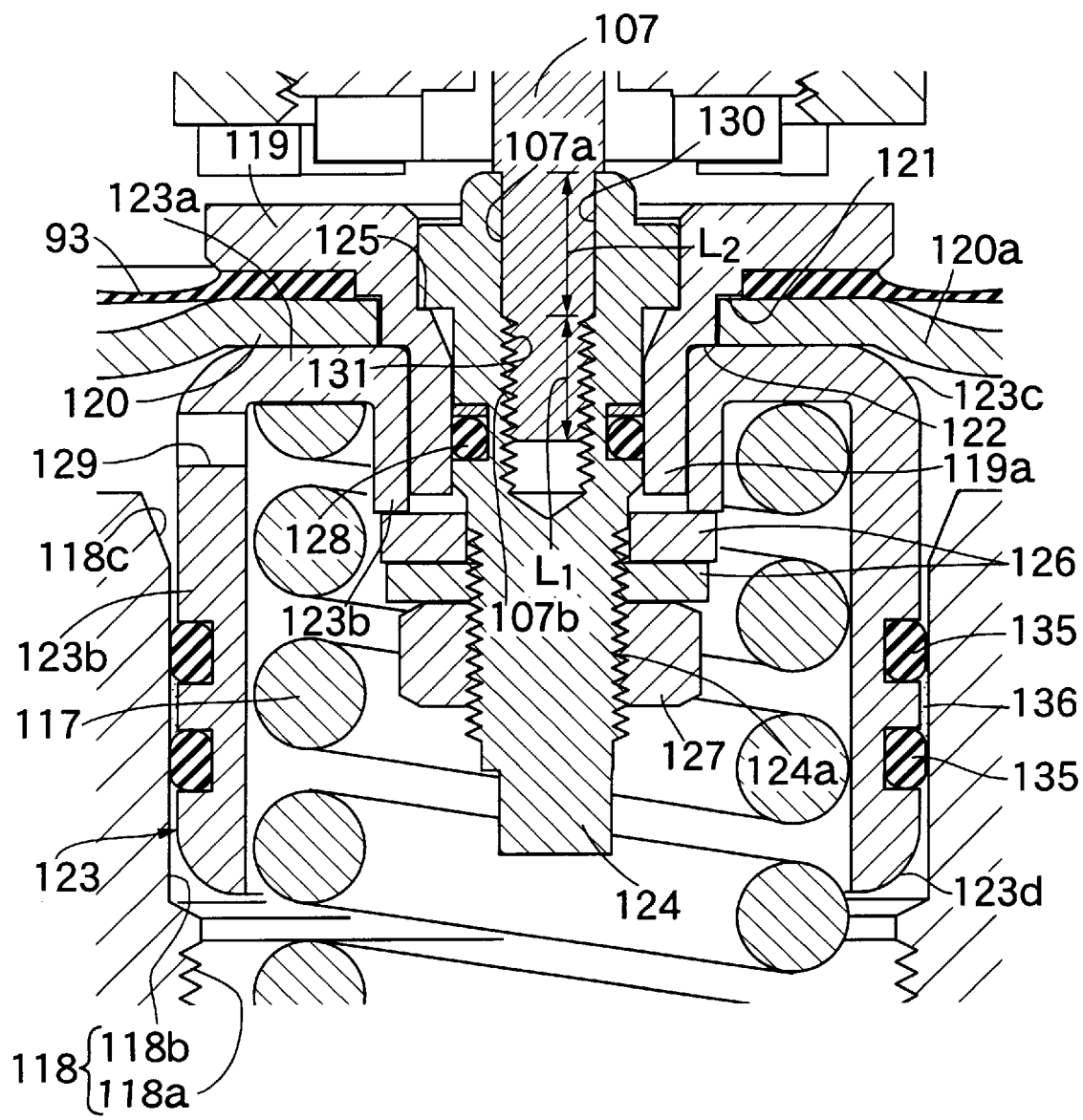
Figure 11:
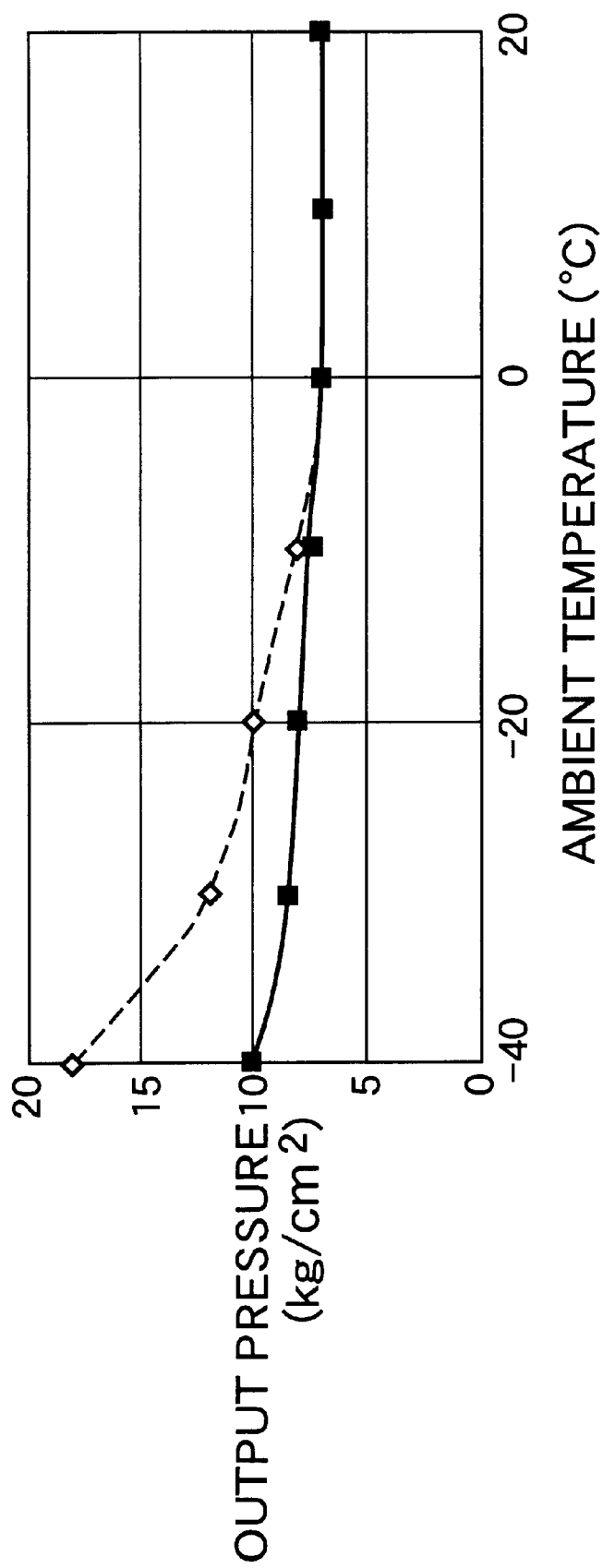
Figure 12:
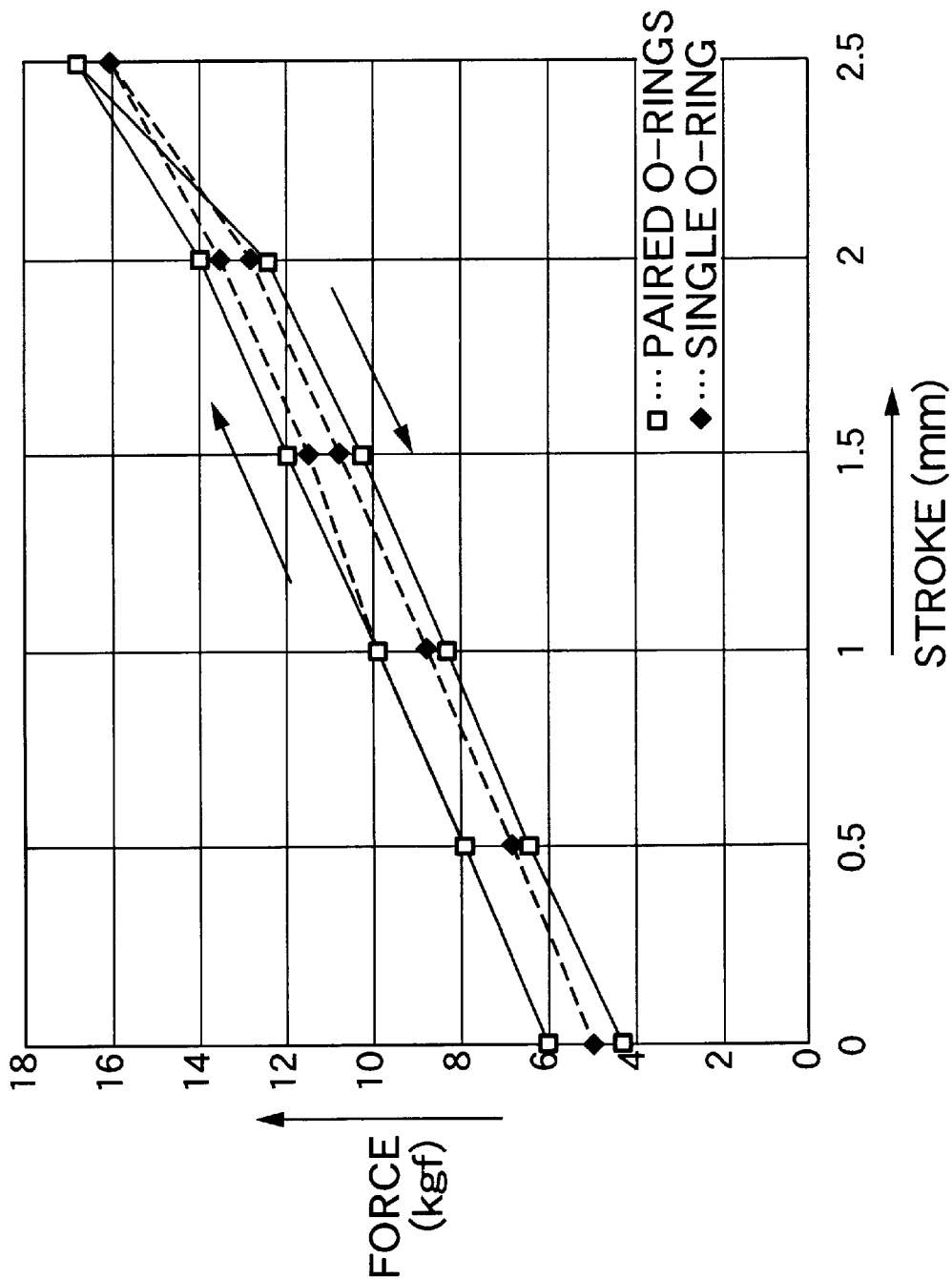

With additional reference to FIG. 10, against the face of the central portion of the diaphragm 93, as confronting the pressure-reducing chamber 94, there abuts a first diaphragm retainer 119 which has an integrated cylindrical portion 119a protruding through the center portion of the diaphragm 93 toward the spring chamber 116. Against the face of the central portion of the diaphragm 93, as confronting the spring chamber 116, there abuts a second diaphragm retainer 120 which engages at its inner circumference with an annular stepped portion 121 formed on the outer face of the cylindrical portion 119a, to clamp the central portion of the diaphragm 93 between the first and second diaphragm retainers 119 and 120.

In the sliding bore portion 118b of the accommodation bore 118, on the other hand, there is so fitted a piston 123 formed into a cylindrical shape that it can slide axially within a restricted range. The piston 123 is provided at its end portion on the side of the diaphragm 93 with: an abutment plate portion 123a, which has a ring plate shape to abut against both an annular stepped portion 122 formed on the outer face of the cylindrical portion 119a and the second diaphragm retainer 120; and a cylindrical portion 123b leading to the inner circumference of the abutment plate portion 123a to enclose the cylindrical portion 119a. Moreover, the leading end of the cylindrical portion 123b of the piston 123 is positioned outside of the leading end of the cylindrical portion 119a of the first diaphragm retainer 119.

Into the central portion of the first diaphragm retainer 119, there is inserted a diaphragm rod 124 from the side of the pressure-reducing chamber 94. On the inner face of the cylindrical portion 119a of the first diaphragm retainer 119, there is formed an annular stepped portion 125 which confronts the pressure-reducing chamber 94. The diaphragm rod 124 engages with the annular stepped portion 125. On the protrusion from the cylindrical portion 119a, i.e., on the diaphragm rod 124, there is formed a threaded stem portion 124a. A nut 127 is screwed on the threaded stem portion 124a while interposing washers 126 between the nut 127 and the leading end of the cylindrical portion 123b. By fastening the nut 127, the central portion of the diaphragm 93 is clamped between the two diaphragm retainers 119 and 120, and the diaphragm rod 124 is fixed at the central portion of the diaphragm 93, so that the piston 123 is jointed to the central portion of the diaphragm 93. In order to seal up the pressure-reducing chamber 94 and the spring chamber 116, moreover, an annular seal member 128, as mounted on the outer circumference of the diaphragm rod 124, contacts elastically with the inner face of the cylindrical portion 119a.

The other end portion of the valve stem 107, i.e., the end portion on the side of the diaphragm 93 is coaxially fastened to the diaphragm rod 124. This diaphragm rod 124 is provided with a fitting bore 130 opened at its one end on the side of the valve stem 107, and a bottomed threaded bore 131 made diametrically smaller than the fitting bore 130 and coaxially leading to the other end of the fitting bore 130. On the other hand, the valve stem 107 is provided with a fitted stem portion 107a to be fitted in the fitting bore 130, and an externally threaded portion 107b coaxially leading to the fitted stem portion 107a so that it can be screwed in the threaded bore 131. The externally threaded portion 107b has an axial length L1 set shorter than the axial length L2 of the fitting bore 130 (that is, L1<L2).

Moreover, the seal member 128 to contact elastically with the inner face of the cylindrical portion 119a is mounted on the outer circumference of the diaphragm rod 124 at the portion corresponding to the outside of the threaded bore 131 made diametrically smaller than the fitting bore 130, so that the diaphragm rod 124 can be made diametrically as small as possible.

Here, the diaphragm 93 is made such that the thickness of the joint portion, i.e., the central portion of the valve stem 107 and the thickness of the portion to be clamped between the body 34 and the cover 91, i.e., the circumferential edge portion are made relatively large, and such that the portion jointing the central portion and the circumferential edge portion is curved to have a relatively small thickness. According to this diaphragm, it is possible to improve the pressure resistance of the diaphragm 93 and the responsiveness at a cold time.

The second diaphragm retainer 120 is integrally provided at its outer circumferential side with a deflection regulating portion 120a for regulating the deflection of the diaphragm 93 toward the spring chamber 116. This deflection regulating portion 120a is curved to bulge toward the spring chamber 116 so that its outer circumferential edge is positioned close to the inner face of the cover 91. Moreover, the diaphragm 93 is made thicker at its portion corresponding to the clearance between the outer edge of the deflection regulating portion 120a and the inner circumference of the cover 91 than that clearance.

In the outer end opening of the accommodation bore 118, i.e., in the threaded bore portion 118a, there is so screwed an adjust screw 132 as to move back and forth. The coil spring 117 is interposed under compression between the adjust screw 132 and the abutment plate portion 123a of the piston 123 connected to the central portion of the diaphragm 93. By adjusting the moving position of the adjust screw 132, therefore, it is possible to adjust the spring load on the coil spring 117. In the inner end of the adjust screw 132, moreover, there is formed a recess 132a for receiving the entire end portion of the coil spring 117 on the side opposed to the diaphragm 93.

On the protrusion of the adjust screw 132 from the cover 91, on the other hand, there is screwed a lock nut 133. In the adjust screw 132, there is formed an open bore 134 for venting the spring chamber 116 to the atmosphere.

Here, the piston 123 slides integrally with the diaphragm 93. On the outer face of this piston 123, there are so mounted a plurality of, e.g., a pair of O-rings 135 and 135 for elastically slidably contacting with the inner face of the cover 91 that they are spaced in the axial direction of the piston 123. The space between the two O-rings 135 and 135 and between the outer face of the piston 123 and the cover 91 is filled up with grease 136. When the two O-rings 135 and 135 are mounted on the piston 123 from its one axial side, moreover, one of the two O-rings 135 and 135 may be damaged by the O-ring grooves. On the outer face of the two axial ends of the piston 123, however, there are provided curved chamfered portions 123c and 123d, so that the O-rings 135 and 135 can be individually mounted easily on the piston 123 from its two axial end sides while being prevented from being damaged by the O-ring grooves. In order that the O-rings 135 and 135 may be prevented from being damaged when the piston 123 carrying them is to be inserted into the accommodation bore 118, on the other hand, this accommodation bore 118 is provided, at its one end opening, i.e., on the inner end opening on the side to fit the piston 123, with a taper chamfered portion 118c.

In order that the piston 123 and the diaphragm 93 in the spring chamber 116 may not be sealed up with the O-rings 135 and 135, the piston 123 is provided at its cylindrical portion 123b with a communication bore 129 extending between the inner and outer faces of the cylindrical portion 123b.

In the body 34, on the other hand, there are arranged a plurality of, e.g., four passages 137, - - - , and 137 which extend upward through the pressure-reducing chamber 94 and which are spaced around the mounting bore 97. On the rising portion 96 of the body 34, moreover, there are raised a plurality of, e.g., four ridges 138 which can contact with the first diaphragm retainer 119 at the central portion of the diaphragm 93 so as to regulate the deflection of the diaphragm 93 toward the pressure-reducing chamber 94 and which form grooves 139 inbetween. When the first diaphragm retainer 119 comes into contact with each of the ridges 138, the CNG having passed the valve hole 104 from the valve chamber 103 can flow toward the pressure-reducing chamber 94 through the grooves 101, which are formed in the end portion of the valve seat member 98 on the side of the pressure-reducing chamber 94, and through the grooves 139.

With no high-pressure CNG having flown into the valve chamber 103 in that primary pressure-reducing valve 37, the diaphragm 93 is deflected toward the pressure-reducing chamber 94 by the spring force of the coil spring 117 so that the valve member 106 leaves the valve seat 105 to open the valve hole 104. Thus, the high-pressure CNG having flown into the valve chamber 103 flows from the valve hole 104 toward the pressure-reducing chamber 94 so that the pressure in the pressure-reducing chamber 94 rises to such a level as to deflect the diaphragm 93 toward the spring chamber 116 against the spring force of the coil spring 117. Then, the valve member 106 is seated on the valve seat 105 to shut the valve hole 104. After these opening/shutting actions of the valve hole 104 were repeated, the CNG having flown at a high pressure of 250 to 10 Kg/cm² into the valve chamber 103 is reduced to 6 to 7 Kg/cm², for example, until it flows from the pressure-reducing chamber 94 to the individual passages 137, - - - , and 137.

In the body 34, on the other hand, there is formed the bottomed mounting bore 97 which is made coaxial with the valve stem 107 and opened toward the pressure-reducing chamber 94. In the mounting bore 97, there is screwed the cylindrical valve seat member 98 which forms the valve chamber 103 for accommodating the valve member 106 between itself and the closed end of the mounting bore 97. The valve seat 105 confronting the valve chamber 103 is formed on the inner face of the end portion of the valve seat member 98 on the side of the pressure-reducing chamber 94. Unlike the construction in which the valve seat is formed on the inner end of the accommodation bore formed in the body to accommodate the valve member and in which the cover member for sealing the outer end of the accommodation bore is mounted on the body, therefore, it is unnecessary to mount the member such as the cover member, and it is possible to reduce the number of parts and to increase the degree of freedom for arranging the primary pressure-reducing valve 37 on the body 34. Since the valve seat 105 is formed on the inner face of the end portion of the valve seat member 98 on the side of the pressure-reducing chamber 94, moreover, the valve member 106 can be arranged as close to the pressure-reducing chamber 94 as possible to make a contribution to a size reduction of the body 34.

On the other hand, one end portion of the valve stem 107 is borne in the body 34 through the bearing 109. The guide portions 110 to come into sliding contact with the inner face of the valve seat member 98 at a plurality of circumferentially spaced portions are formed on the outer face of the valve member 106. Between the individual guide portions 110 and between the valve member 106 and the valve seat member 98, there are formed the communication passages 111 which extend in the axial direction of the valve stem 107. As a result, one end portion of the valve stem 107 is so borne in the body 34 as to move in the axial direction, and the valve stem 107 is so borne at the portion, in which the valve member 106 is fixed, in the body 34 through the valve member 106 and the valve seat member 98 as to move in the axial direction. Even if the transverse load by the coil spring 117 acts on the valve stem 107 or if the diaphragm 93 is misaligned, the valve stem 107 can be prevented from falling down to align the valve seat 105 and the valve member 106 accurately, so that the valve member 106 can be reliably seated along its entire circumference on the valve seat 105.

Here, the valve member 106 is made of a synthetic resin so that it grows harder to degrade its sealing performance as the ambient temperature drops. As a result, the deterioration in the pressure regulation accompanying the inclination of the valve member 106 with respect to the valve seat 105 appears the more prominent as the ambient temperature grows the lower. In the construction in which only one end side of the valve stem 107 is borne in the body 34, as plotted by a broken curve in FIG. 11, the deteriorated in the pressure regulation is caused at a lower temperature by the inclination of the valve member so that the pressure reduction drops. In the aforementioned construction in which the valve stem 107 is borne at its one end portion and at the portion of the valve member 106 by the body 34 and the valve seat member 98, on the contrary, the valve member 106 can be properly seated on the valve seat 105 at all times without any inclination, as plotted by a solid curve in FIG. 11, so that a higher pressure reduction can be achieved while preventing the deterioration in the pressure regulation.

Moreover, the sliding resistance resulting from the fact that the individual guide portions 110 provided on the valve member 106 of the synthetic resin are in sliding contact with the inner face of the valve seat member 98 is established against the vibration of the coil spring 117 so that the self-excited vibration can be prevented to the least.

On the other hand, the valve seat member 98 is screwed into the mounting bore 97. On the end face of the valve seat member 98 on the side of the pressure-reducing chamber 94, there are raised the protrusions 102 which form inbetween the grooves 101 extending in the radial direction of the valve stem 107 in the plane normal to the axis of the valve stem 107. As a result, a tool can be applied to the grooves 101 between the individual ridges 102 to turn the valve seat member 98 thereby to facilitate the mounting of the valve seat member 98 on the body 34.

The valve stem 107 is fastened to the diaphragm rod 124 which is fixed at the central portion of the diaphragm 93. The diaphragm rod 124 is provided with the fitting bore 130 and the bottomed threaded bore 131 coaxially leading to the fitting bore 130. The valve stem 107 is provided with the fitted stem portion 107a to be fitted in the fitting bore 130, and the externally threaded portion 107b coaxially leading to the fitted stem portion 107a and capable of being screwed in the threaded bore 131. The axial length Li of the externally threaded portion 107b is set shorter than the axial length L2 of the fitting bore 130. At the start of screwing the externally threaded portion 107b into the threaded bore 131, therefore, the fitted stem portion 107a has already been partially fitted in the fitting bore 130. Even if chips are produced by screwing the externally threaded portion 107b into the threaded bore 131, therefore, they are confined between the valve stem 107 and the diaphragm rod 124 so that their removing works can be eliminated to improve the assembling efficiency.

In the cover 91, on the other hand, there is so formed the accommodation bore 118 which is opened at its outer end to insert/remove the coil spring 117 that it is arranged coaxially with the valve hole 104. The adjust screw 132 to be screwed into the outer end opening of the accommodation bore 118 is provided with the recess 132a for receiving the entire end portion of the coil spring 117 on the side opposed to the diaphragm 93. This makes it unnecessary for the coil spring 117 to be received by the retainer on the side opposed to the diaphragm 93, so that the number of parts can be reduced. When the circumferential edge portion of the diaphragm 93 is clamped between the body 34 and the cover 91, moreover, the coil spring 117 can be removed from the cover 91, and the cover 91 can be fastened in the body 34 while avoiding the application of the offset load to the diaphragm 93. As a result, the diaphragm 93 can be prevented from being displaced, and the valve member 106 can be reliably seated on the valve seat 105 to prevent the deterioration in the pressure regulation. When the coil spring 117 is compressed by the adjust screw 132, on the other hand, the guide function of the end portion of the coil spring 117 is performed by the recess 132a of the adjust screw 132 so that the coil spring 117 can be prevented from being inclined.

On the outer face of the piston 123 to reciprocate in the axial direction of the valve stem 107 in response to the deflection of the diaphragm 93, moreover, there are mounted the paired O-rings 135 and 135 which come elastically into sliding contact with the inner face of the cover 91, so that the sliding resistance to the self-excited vibration of the coil spring 117 can be established.

The sliding resistance could also be achieved by mounting only one O-ring 135 on the outer face of the piston 123. When this single O-ring 135 is mounted, however, the hysteresis is exhibited by broken curves in FIG. 12. When the paired O-rings 135 and 135 are mounted, on the other hand, a larger hysteresis is exhibited, as plotted by solid curves in FIG. 12. A higher sliding resistance to the self-excited vibrations of the coil spring 117 can be established by the paired O-rings 135 and 135.

Moreover, the space between the two O-rings 135 and 135 is filled up with the grease 136 so that their individual wears can be suppressed while avoiding the outflow of the grease 136 as much as possible even for a long run. Even if the individual O-rings 135 and 135 are blotted with the oil component which is carried by the air having entered the spring chamber 116 from the outside, on the other hand, the sliding resistance is set in the initial state considering the grease 136 so that no reduction in the sliding resistance is invited. Since the necessary sliding resistance is established by the paired O-rings 135 and 135, moreover, the individual O-rings 135 and 135 are not diametrically enlarged even if the compressibility considering the permanent strains of the individual O-rings 135 and 135 are set for a proper sliding resistance. Thus, it is possible to increase the degree of freedom for arranging the O-rings 135 and 135.

On the other hand, the piston 123 is so slidably fitted in the cover 91 as to move within the range restricted in the axial direction of the valve stem 107 and is connected to the central portion of the diaphragm 93. This can give the piston 123 the aligning function to align the direction of deflection of the diaphragm 93 to the axis of the valve hole 104. Specifically, the diaphragm 93 is subjected to the spring force in the direction to reduce the capacity of the pressure-reducing chamber 94 by the coil spring 117 having a relatively high spring force. When the coil spring 117 falls down, however, the deflection direction of the diaphragm 93, i.e., the axis of the valve stem 107 also falls down, and the seating of the valve member 106 on the valve seat 105 may become incomplete to cause the deterioration in the pressure regulation. Since the piston 123 is slidably fitted in the cover 91, however, it is possible to prevent the fall of the axis of the valve stem 107 and accordingly the deterioration in the pressure regulation.

Moreover, the piston 123 is provided with the communication bore 129 for providing the communication between the inside and outside of the piston 123, so that the back pressure of the diaphragm 93 can be prevented from being undesirably raised or lowered in response to the forward or backward movements of the diaphragm 93 and the piston 123.

Moreover, the deflection regulating portion 120a on the outer circumference of the second diaphragm retainer 120 to abut against or to be fixed on the central portion of the diaphragm 93 on the side of the spring chamber 116 is so curved to bulge toward the spring chamber 116 as to bring its outer circumferential edge close to the inner face of the cover 91. When a pressure exceeding a predetermined level is applied to the pressure-reducing chamber 94, therefore, the diaphragm 93 can be smoothly curved, as indicated by chained lines in FIG. 8, from the second diaphragm retainer 120 to the inner face of the cover 91. Thus, the durability of the diaphragm 93 can be improved by preventing the diaphragm 93 from being bent toward the spring chamber 116 at the outer edge of the second diaphragm retainer 120 and by preventing the lifetime of the diaphragm 93 from being shortened by the bent.

Secondary Pressure-Reducing Valve 38

Figure 13:
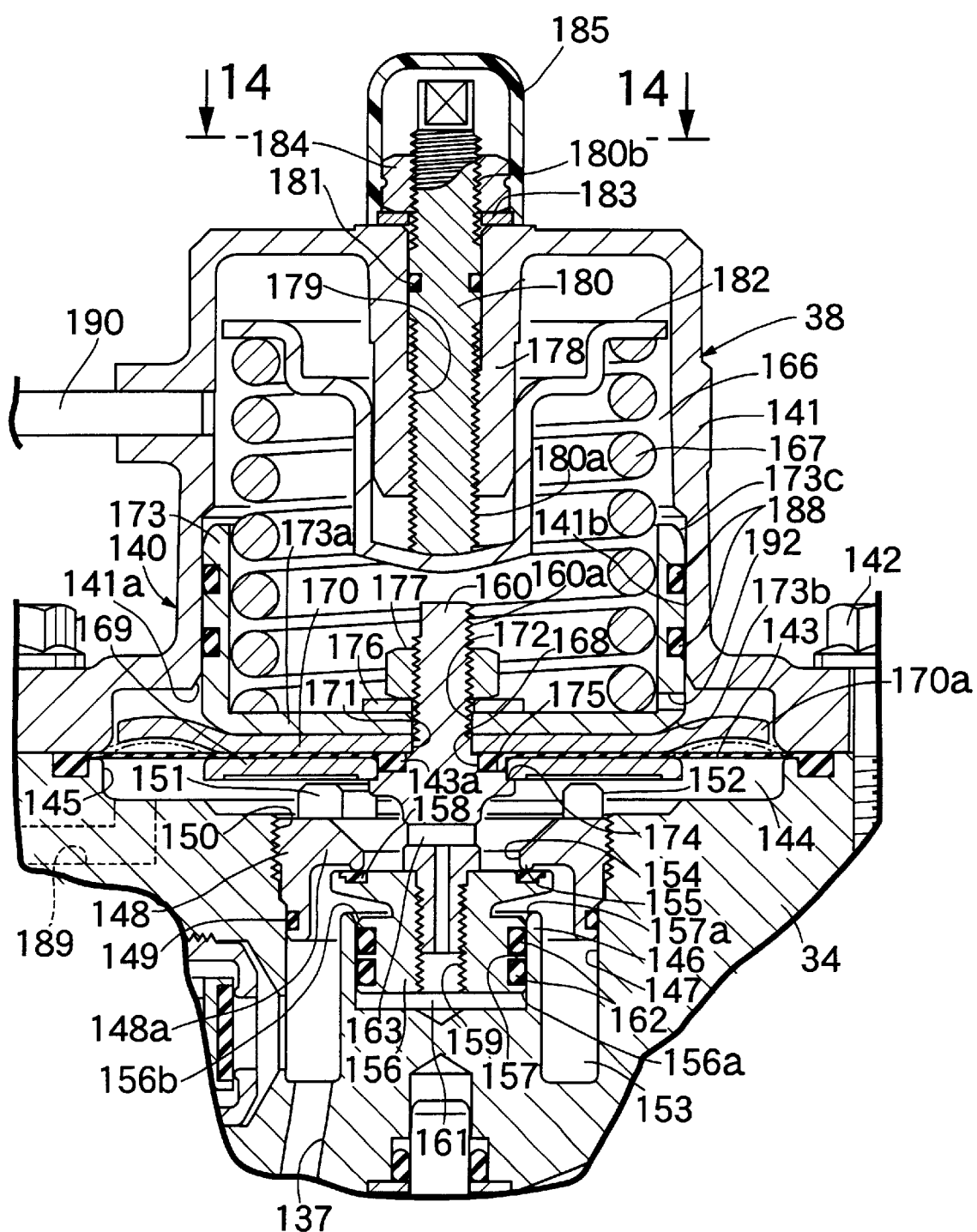

With additional reference to FIG. 13, the valve housing 140 of the secondary pressure-reducing valve 38 is constructed to include the upper portion of the body 34, and a cover 141 which is fastened by means of a plurality of bolts 142 on the upper face of the flanged portion 77 belonging to the upper portion of the body 34. A diaphragm 143 is clamped at its circumferential edge portion between the upper face of the body 34 and the cover 141.

In the upper face of the body 34, there is formed a recess 145 for forming a pressure-reducing chamber 144 between the body 34 and the diaphragm 143. In the body 34, there is vertically extended a bottomed mounting bore 147 which is opened at its upper end toward the pressure-reducing chamber 144 at the central portion of the closed end of the recess 145 and closed at its lower end. Moreover, the mounting bore 147 is provided at its closed inner end with a rising portion 146 which rises toward the pressure-reducing chamber 144.

In the inner face of the end portion of the mounting bore 147 on the side of the pressure-reducing chamber 144, there is formed an internal thread 150, in which a cylindrical valve seat member 148 is screwed. On the outer face of this valve seat member 148, there is mounted an annular seal member 149 for elastically contacting with the inner face of the mounting bore 147 on the inner side of the internal thread 150.

On the end face of the valve seat member 148 on the side of the pressure-reducing chamber 144, moreover, there are formed a plurality of, e.g., four ridges 152 for forming inbetween a plurality of, e.g., four grooves 151 extending radially of the valve seat member 148 in a plane normal to the axis of the mounting bore 147. These grooves 151 are arranged in the shape of a cross. When the valve seat member 148 is to be fastened in the internal thread 150, the not-shown tool can be applied to the cross-shaped grooves 151 to turn the valve seat member 148 so that the valve seat member 148 can be easily mounted on the body 34.

Between the valve seat member 148 and the closed portion of the lower end of the mounting bore 147, there is formed a valve chamber 153, which has communication with the passages 137 and 137 for guiding the CNG from the primary pressure-reducing valve 37. On the other hand, the valve seat member 148 is integrally provided at its end portion on the side of the pressure-reducing chamber 144 with an inward flange 148a extending radially inward. In the inner circumference of this inward flange 148a, there is formed a valve hole 154 communicating with the pressure-reducing chamber 144. On the inner face of the inward flange 148a, there is so formed an annular valve seat 155 which confronts the valve chamber 153 while opening the valve hole 154 in the central portion that it protrudes toward the valve chamber 153.

In the rising portion 146, there is formed coaxially with the valve hole 154 a bottomed sliding bore 157 which is opened toward the valve hole 154. A valve member 156 is slidably fitted in the sliding bore 157. On the valve member 156, moreover, there is fixed an annular rubber seal 158 which can be seated on the valve seat 155.

In the valve member 156, there is coaxially formed a threaded bore 159 which extends through the two axial ends of the valve member 156. A valve stem 160, as made coaxial with the valve hole 154, is screwed at its one end in the threaded bore 159. In short, the valve member 156 is fixed at one end of the valve stem 160.

A back pressure chamber 161 is formed between the valve member 156 and the closed end of the sliding bore 157. On the outer face of the valve member 156, there are so mounted a plurality of, e.g., a pair of O-rings 162 and 162 to come into elastically sliding contact with the inner face of the sliding bore 157 that they are spaced in the axial direction of the valve member 156. The space between these two O-rings 162 and 162 and between the outer face of the valve member 156 and the inner face of the sliding bore 157 is filled up with the (not-shown) grease.

When the two O-rings 162 and 162 are mounted on the valve member 156 from its axial one side, moreover, one of the O-rings 162 and 162 may be damaged by the O-ring groove. On the outer faces of the two axial ends of the valve member 156, however, there are formed the curved chamfered portions 156a and 156b so that the O-rings 162 and 162 can be individually mounted easily on the valve member 156 from its two axial end sides while being prevented from being damaged by the O-ring grooves. In order the O-rings 162 and 162 may be prevented from any damage when the valve member 156 carrying them is to be inserted into the sliding bore 157, a taper chamfered portion 157a is formed on the one end opening of the sliding bore 157 on the side to fit the valve member 156, that is, on the inner end opening.

Between the cover 141 and the diaphragm 143, there is formed a spring chamber 166, in which there is accommodated a coil spring 167 for urging the diaphragm 143 toward the pressure-reducing chamber 144.

The diaphragm 143 is provided at its central portion with a through bore 168 and an annular seal portion 143a enclosing the through bore 168. Against the face of the diaphragm 143 on the side of the pressure-reducing chamber 144, there abuts a first diaphragm retainer 169 having a ring-plate shape enclosing the seal portion 143a. Against the face of the central portion of the diaphragm 143 on the side of the spring chamber 166, there abuts a second diaphragm retainer 170 having a through hole 171 in a center portion while clamping the diaphragm 143 between itself and the first diaphragm retainer 169.

In the spring chamber 166 at the portion of the cover 141 closer to the diaphragm 143, on the other hand, there is formed a sliding bore 141b for fitting a cylinderical piston 173 in a manner to allow it to slide in the axial direction within a restricted range. This piston 173 is provided at its end portion on the side of the diaphragm 143 with an abutment plate portion 173a of a ring-plate shape which has a through hole 172 corresponding to the through hole 171 to abut against the second diaphragm retainer 170.

The valve stem 160 having the valve member 156 on its one end is extended coaxially through the valve hole 154 toward the spring chamber 166. The valve stem 160 is provided with: an annular stepped portion 174 to engage with the inner circumference edge of the first diaphragm retainer 169; and an annular stepped portion 175 for clamping the seal portion 143a between itself and the second diaphragm retainer 170. A threaded stem portion 160a is formed at the other end portion of the valve stem 160 which protrudes through the through bores 168, 171 and 172 into the spring chamber 166. A nut 177 is screwed on the threaded stem portion 160a while interposing a washer 176 between itself and the second diaphragm retainer 170. By fastening the nut 177, the central portion of the diaphragm 143 is clamped between the two diaphragm retainers 169 and 170, and the valve stem 160 is connected to the central portion of the diaphragm 143. In the valve stem 160, moreover, there is formed a communication passage 163 for causing the pressure-reducing chamber 144 to communicate with the back pressure chamber 161.

The second diaphragm retainer 170 is integrally provided at its outer circumferential side with a deflection regulating portion 170a for regulating the deflection of the diaphragm 143 toward the spring chamber 166. This deflection regulating portion 170a is curved to bulge toward the spring chamber 166 so that its outer circumferential edge is positioned close to the inner face of the cover 141.

Here, the cover 141 is integrally provided at its outer end closed portion with a supporting cylindrical portion 178 which has two open ends and an internal thread 179 is formed in the inner face of its inner end portion. Into this supporting cylinder portion 178, there is inserted an adjust screw 180. This adjust screw 180 is protruded into the spring chamber 166 by screwing its external thread portion 180a on its axially inner end in the internal thread 179. The adjust screw 180 is further provided at its axially outer side with an external thread portion 180b, which is protruded to the outside of the cover 141. On the outer face of the axially intermediate portion of the adjust screw 180, moreover, there is mounted an annular seal member 181 which elastically contacts with the inner face of the supporting cylinder portion 178.

In the spring chamber 166, a retainer 182 is supported in abutment by the inner end of the adjust screw 180, and the coil spring 167 is interposed under compression between the retainer 182 and the abutment plate portion 173a of the piston 173 connected to the central portion of the diaphragm 143. By adjusting the moving position of the adjust screw 180, therefore, the spring load of the coil spring 167 can be adjusted.

On the protruded portion of the adjust screw 180 from the cover 141, i.e., on the external thread portion 180b, on the other hand, there is screwed a nut 184 while interposing a washer 183 between itself and the cover 141. By loosening the nut 184, the moving position of the adjust screw 180 can be adjusted.

Figure 14:
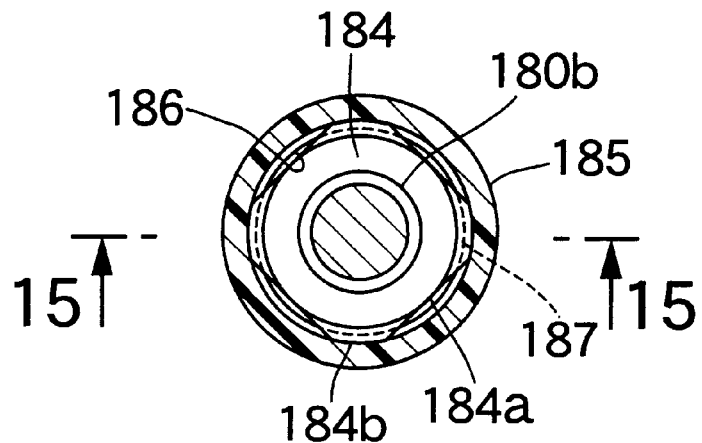
Figure 15:
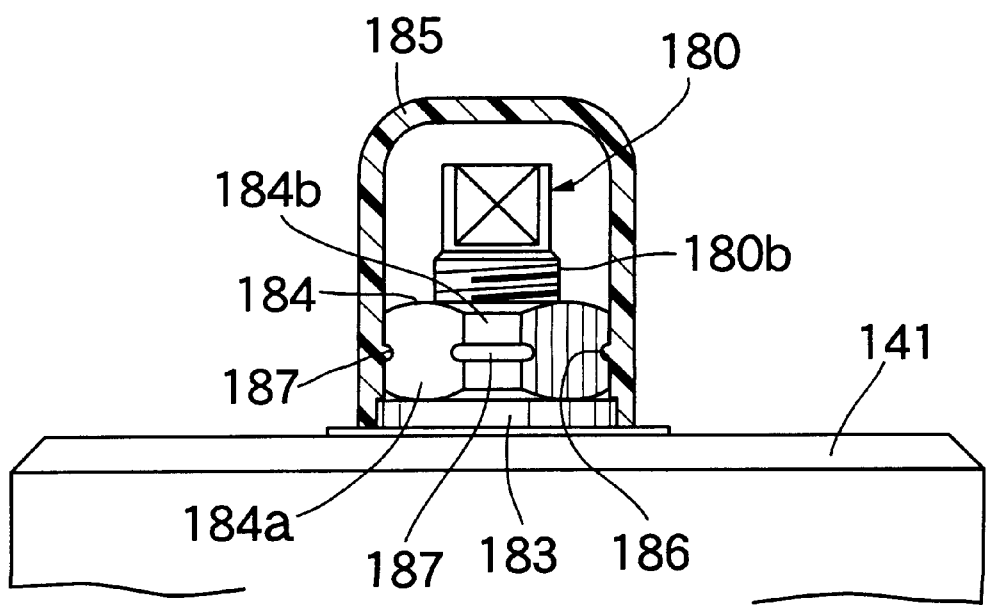

With additional reference to FIGS. 14 and 15, the outer end portion of the adjust screw 180 and the nut 184 are covered with a cap 185 made of a synthetic resin. Moreover, the nut 184 is provided with an outer periphery which is constructed to include four flat faces 184a arranged in parallel with the axis of the adjust screw 180 and equidistantly in the peripheral direction, and four curved faces 184b joining those flat faces 184a. These individual curved faces 184b are provided with engagement grooves 187 for causing an annular engagement protrusion 186 projected from the inner face of the cap 185.

Here, the piston 173 slides integrally with the diaphragm 143. On a plurality of, e.g., two axially spaced portions of the outer face of this piston 173, there are mounted O-rings 188 and 188 for elastically slidably contacting with the inner face of the cover 141. The space between the two O-rings 188 and 188 and between the outer face of the piston 173 and the inner face of the cover 141 is filled up with the (not-shown) grease. When the two O-rings 188 and 188 are mounted on the piston 173 from its one axial side, moreover, one of the two O-rings 188 and 188 may be damaged by the O-ring grooves. On the outer face of the two axial ends of the piston 173, however, there are provided curved chamfered portions 173b and 173c, so that the O-rings 188 and 188 can be individually mounted easily on the piston 173 from its two axial end sides while being prevented from being damaged by the O-ring grooves. In order that the O-rings 188 and 188 may be prevented from being damaged when the piston 173 carrying them is to be inserted into the cover 141, on the other hand, this cover 141 is provided, in its sliding bore 141b at its one end opening on the side to fit the piston 173, i.e., on the inner end opening on the side to fit the piston 173, with a taper chamfered portion 141a.

In order that the piston 173 and the diaphragm 143 in the spring chamber 166 may not be sealed up with the O-rings 188 and 188, the piston 173 is provided with a communication bore 192 extending between the inner and outer faces of the piston 173.

In the body 34, on the other hand, there is formed a passage 189 leading to the pressure-reducing chamber 144. To the passage 189, there is connected the conduit 30 which leads to the injector 29 of the engine E. Moreover, a connection tube 190 is connected to the cover 141 so that the intake suction of the engine E is introduced into the spring chamber 166 via the connection tube 190 and the (not-shown) conduit connected to the tube 190.

With no high-pressure CNG having flown into the valve chamber 153 in that secondary pressure-reducing valve 38, the diaphragm 143 is deflected toward the pressure-reducing chamber 144 by the spring force of the coil spring 167 so that the valve member 156 leaves the valve seat 155 to open the valve hole 154. Thus, the high-pressure CNG having flown into the valve chamber 153 flows from the valve hole 154 toward the pressure-reducing chamber 144 so that the pressure difference between the pressure-reducing chamber 144 and the spring chamber 166 rises to such a level as to deflect the diaphragm 143 toward the spring chamber 166 against the spring force of the coil spring 167. Then, the valve member 156 is seated on the valve seat 155 to shut the valve hole 154. After these opening/shutting actions of the valve hole 154 were repeated, the CNG having flown at the pressure of 6 to 7 Kg/cm$^2$ into the valve chamber 153 is reduced to 2 to 3 Kg/cm$^2$, for example, until it is fed from the pressure-reducing chamber 144 to the injector 29 via the passage 189 and the conduit 30.

In the body 34, on the other hand, there is formed the bottomed mounting bore 147 which is made coaxial with the valve stem 160 and opened toward the pressure-reducing chamber 144. In the mounting bore 147, there is screwed the cylindrical valve seat member 148 which forms the valve chamber 153 for accommodating the valve member 156 between itself and the closed end of the mounting bore 147. The valve seat 155 confronting the valve chamber 153 is formed on the inner face of the end portion of the valve seat member 148 on the side of the pressure-reducing chamber 144. Unlike the construction in which the valve seat is formed on the inner end of the accommodation bore formed in the body to accommodate the valve member and in which the cover member for sealing the outer end of the accommodation bore is mounted on the body, therefore, it is unnecessary to mount the member such as the cover member, and it is possible to reduce the number of parts and to increase the degree of freedom for arranging the secondary pressure-reducing valve 38 on the body 34. Since the valve seat 155 is formed on the inner face of the end portion of the valve seat member 148 on the side of the pressure-reducing chamber 144, moreover, the valve member 156 can be arranged as close to the pressure-reducing chamber 144 as possible to make a contribution to a size reduction of the body 34.

On the other hand, the valve seat member 148 is screwed into the mounting bore 147. On the end face of the valve seat member 148 on the side of the pressure-reducing chamber 144, there are raised the protrusions 152 which form inbetween the grooves 151 extending in the radial direction of the valve stem 160 in the plane normal to the axis of the valve stem 160. As a result, a tool can be applied to the grooves 151 between the individual ridges 152 to turn the valve seat member 148 thereby to facilitate the mounting of the valve seat member 148 on the body 34. Moreover, the deflection of the diaphragm 143 toward the pressure-reducing chamber 144 is regulated by abutting against the individual protrusions 152. Even with the diaphragm 143 abutting against the individual protrusions 152, the valve hole 154 and the pressure-reducing chamber 144 can communicate with each other through the individual grooves 151.

On the outer face of the valve member 156 to reciprocate in the axial direction of the valve stem 160 in accordance with the deflection of the diaphragm 143, there are further mounted a plurality of, e.g., a pair of O-rings 162 and 162 which come into elastically sliding contact with the body 34. On the outer face of the piston 173 to reciprocate in the axial direction of the valve stem 160 in response to the deflection of the diaphragm 143, there are mounted the paired O-rings 188 and 188 which come elastically into sliding contact with the inner face of the cover 141, so that a high sliding resistance to the self-excited vibration of the coil spring 167 can be established.

Moreover, the spaces between the O-rings 162 and 162 and the O-rings 188 and 188 are filled up with the grease so that their individual wears can be suppressed while avoiding the outflow of the grease as much as possible even for a long run. Even if the individual O-rings 162 and 162 are blotted with the oil component which is carried by the CNG or if the O-rings 188 and 188 are blotted with the oil component which is carried by the air introduced into the spring chamber 166 from the outside, on the other hand, the sliding resistance is set in the initial state considering the grease so that no reduction in the sliding resistance is invited. Since the necessary sliding resistance is established by the paired O-rings: 162 and 162; and 188 and 188, moreover, the individual O-rings 162 and 188 are not diametrically enlarged even if the compressibility considering the permanent strains of the individual O-rings 162 and 188 is set for a proper sliding resistance. Thus, it is possible to increase the degree of freedom for arranging the O-rings: 162 and 162; and 188 and 188.

On the other hand, the piston 173 is so slidably fitted in the cover 141 as to move within the range restricted in the axial direction of the valve stem 160 and is connected to the central portion of the diaphragm 143. This can give the piston 173 the aligning function to align the direction of deflection of the diaphragm 143 to the axis of the valve hole 154. Specifically, the diaphragm 143 is subjected to the spring force in the direction to reduce the capacity of the pressure-reducing chamber 144 by the coil spring 167 having a relatively high spring force. When the coil spring 167 falls down, however, the deflection direction of the diaphragm 143, i.e., the axis of the valve stem 160 also falls down, and the seating of the valve member 156 on the valve seat 155 may become incomplete to cause the deterioration in the pressure regulation. Since the piston 173 is slidably fitted in the cover 141, however, it is possible to prevent the fall of the axis of the valve stem 160 and accordingly the deterioration in the pressure regulation.

Moreover, the piston 173 is provided with the communication bore 192 for providing the communication between the inside and outside of the piston 173, so that the back pressure of the diaphragm 143 can be prevented from being undesirably raised or lowered in response to the forward or backward movements of the diaphragm 143 and the piston 173.

Moreover, the deflection regulating portion 170a on the outer circumferential portion of the second diaphragm retainer 170 to abut against or to be fixed on the central portion of the diaphragm 143 on the side of the spring chamber 166 is so curved to bulge toward the spring chamber 166 as to bring its outer circumferential edge close to the inner face of the cover 141. When a pressure exceeding a predetermined level is applied to the pressure-reducing chamber 144, therefore, the diaphragm 143 can be smoothly curved, as indicated by chained lines in FIG. 13, from the second diaphragm retainer 170 to the inner face of the cover 141. Thus, the durability of the diaphragm 143 can be improved by preventing the diaphragm 143 from being bent toward the spring chamber 166 at the outer edge of the second diaphragm retainer 170 and by preventing the lifetime of the diaphragm 143 from being shortened by the bent.

On the other hand, the nut 184, as screwed on the outer end portion of the adjust screw 180 for fixing the moving position of the adjust screw 180, is provided with an outer periphery which is constructed to include f our flat faces 184a arranged in parallel with the axis of the adjust screw 180 and equidistantly in the peripheral direction, and four curved faces 184b joining those flat faces 184a. These individual curved faces 184b are provided with engagement grooves 187 for causing an annular engagement protrusion 186 projected from the inner face of the cap 185. Specifically, the cap 185 is mounted on the nut 184 so that it can be small-sized. Moreover, the nut 184 has the outer periphery of four faces so that the number of steps of working it can be reduced. Since the individual curved faces 184b are individually provided with the engagement grooves 187, moreover, these grooves 187 can be made the longer to achieve the more engagement with the engagement protrusion 186 of the cap 185 thereby to prevent the cap 185 from easily coming out.

Relief Valve 39

Figure 4:
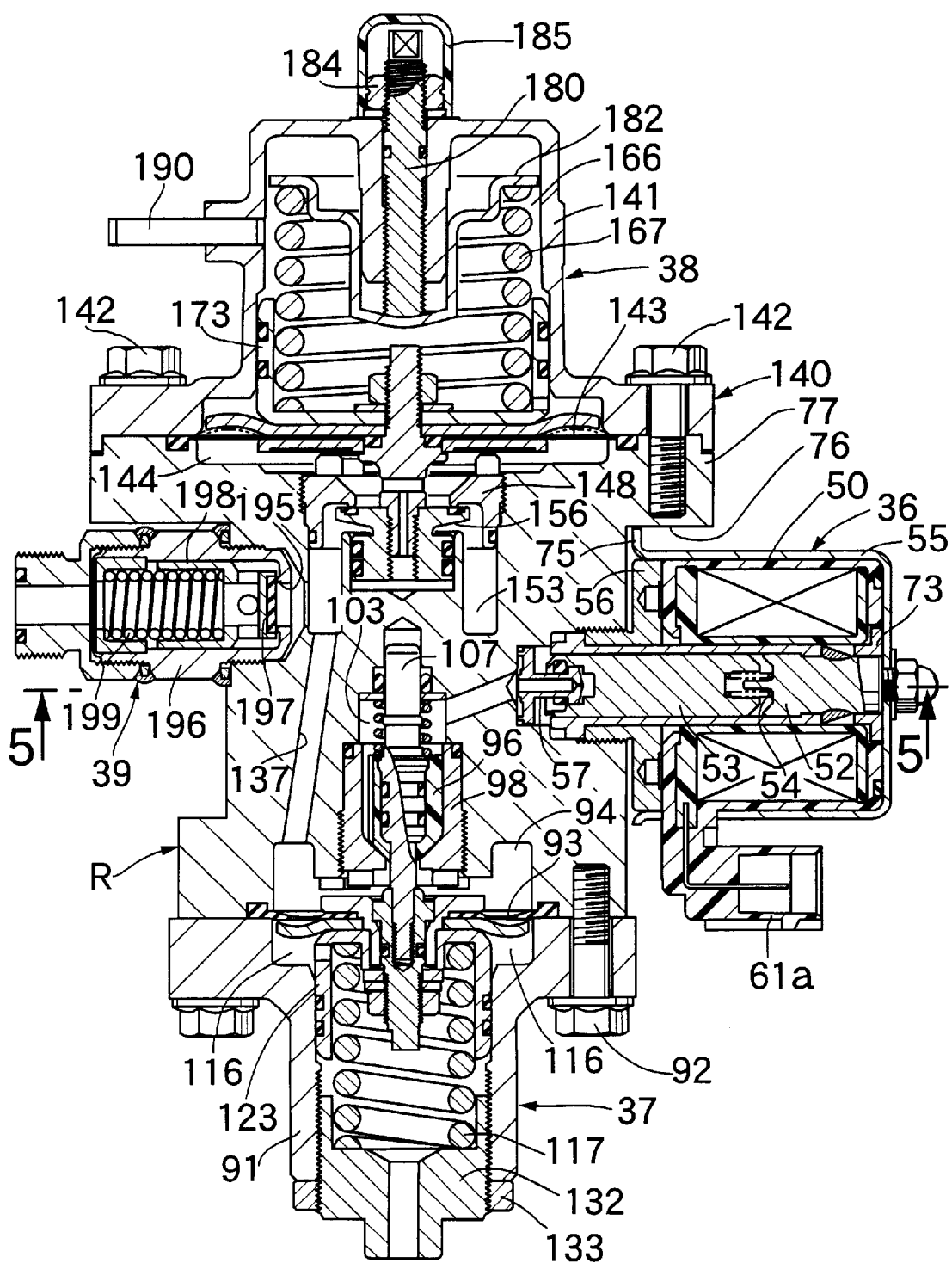

With especial reference to FIG. 4, the relief valve 39 is so mounted on the side portion of the body 34 that it is connected with one of the passages 137, - - - , and 137 joining the primary pressure-reducing valve 37 and the secondary pressure-reducing valve 38. In a valve housing 196 to be fixed to the body 34 while having a valve hole 195 communicating with the passage 137, there are accommodated: a valve member 198 having at its front end a rubber seal 197 for clogging the valve hole 195; and a spring 199 for urging the valve member 198 in the direction to clog the valve hole 195 with the rubber seal 197. The valve housing 196 and the valve member 198 are formed to open the CNG from the passage 137 to the outside when the valve hole 195 is opened.

The relief valve 39 thus constructed is opened to discharge the CNG to the atmosphere when the pressure in the passage 137 rises to exceed a valve opening level, as determined by the spring 199, such as 16.5 Kg/cm$^2$.

Thermostat 40

With especial reference to FIG. 5, the body 34 is so equipped with the warm water passage 33 as to raise no obstruction to the arrangement of the filter 35, the electromagnetic cut-off valve 36, the primary pressure-reducing valve 37, the secondary pressure-reducing valve 38 and the relief valve 39 which are arranged in the body 34. A connection tube 201 leading to the entrance of the warm water passage 33 is attached to the body 34, and the thermostat 40 is mounted in the body 34 on the exit side of the warm water passage 33.

This thermostat 40 is given the construction well known in the art, in which a valve member 204 for opening/closing a valve hole 203 formed in the outer end of a housing 202 fixed in the body 34 is activated according to the extent of expansion of a wax 205 by the water temperature. When this water temperature exceeds 80 degrees, for example, the valve member 204 is activated to close the valve hole 203 by the wax 205 so that the temperature of the body 34 may be adjusted not to exceed 80 degrees.

Here, in the regulator R in which the filter 35, the electromagnetic cut-off valve 36, the primary pressure-reducing valve 37, the secondary pressure-reducing valve 38, the relief valve 39 and the thermostat 40 are arranged in the body 34, the primary pressure-reducing valve 37 and the secondary pressure-reducing valve 38 are so mounted in the lower and upper portions of the body 34 that their valve members 96 and 156 are aligned with each other, and the filter 35, the electromagnetic cut-off valve 36, the relief valve 39 and the thermostat 40 are arranged in the side portion of the body 34. As a result, the regulator R can be made as compact as possible. Moreover, the electromagnetic cut-off valve 36 and the relief valve 39 are arranged in the space which is established below the flanged portion 77 formed in the body 34 so as to fasten the cover 141 of the secondary pressure-reducing valve 38, so that a more contribution can be made to the size reduction of the regulator R.

Although the invention has been detailed in connection its embodiment, it should not be limited thereto but could have a variety of design changes without departing from the gist thereof, as defined by claims.

What is claimed is:

1. A gas pressure-reducing valve comprising a diaphragm clamped at a peripheral edge portion thereof between a body and a cover fastened to said body, said diaphragm being spring-urged toward a side which reduces the capacity of a pressure-reducing chamber formed between said diaphragm and said body, in which a valve member that can be seated on a valve seat having at a central portion thereof an opened valve hole leading to said pressure-reducing chamber is fixed on a valve stem which coaxially extends through said valve hole, and in which said valve stem is fastened to a fastened member fixed on the central portion of said diaphragm, wherein said fastened member is provided with: a fitting bore opened at one end thereof on the side of said valve stem and a bottomed threaded bore having a diameter smaller than that of said fitting bore and coaxially leading to the other end of said fitting bore, wherein said valve stem is provided at an end portion thereof on the side of said diaphragm with a fitting stem portion fitted in said fitting bore and an externally threaded portion capable of being screwed in said threaded bore and coaxially leading to said fitting stem portion, and wherein said externally threaded portion has an axial length shorter than that of said fitting bore.

2. A gas pressure-reducing valve according to claim 1, wherein a coil spring for urging said diaphragm in the direction for reducing the capacity of said pressure-reducing chamber is accommodated in a spring chamber formed between said cover and said diaphragm, wherein said cover is provided with an accommodation bore which is opened at an outer end thereof for insertion and removal of said coil spring and is disposed coaxially with said valve hole, wherein an adjust screw for adjusting the spring load of said coil spring in accordance with a position of said adjust screw advanced and retreated in the axial direction is screwed in an outer end opening of said accommodation bore, and wherein an end portion of said coil spring on the side opposed to said diaphragm is received by said adjust screw.

3. A gas pressure-reducing valve according to claim 2, wherein said adjust screw is provided with a guide portion for guiding said end portion of said coil spring on the side opposed to said diaphragm.

4. A gas pressure-reducing valve according to claim 1, wherein a diaphragm retainer is fixed at the central portion of said diaphragm on the side of a spring chamber formed between said cover and said diaphragm, and an outer peripheral portion of said diaphragm retainer has such an external diameter that permits its outer peripheral edge to be located close to and opposed to an inner surface of said cover, said outer peripheral portion being formed of a curved shape to bulge toward said spring chamber.

5. A gas pressure-reducing valve according to claim 4, wherein said diaphragm is made with a larger thickness, at its portion corresponding to a clearance between the outer peripheral edge of said diaphragm retainer and the inner peripheral surface of said cover, than said clearance.

* * * * *